United States Patent
Tanaka

(10) Patent No.: US 11,474,490 B2
(45) Date of Patent: Oct. 18, 2022

(54) AIR CONDITION CONTROL DEVICE

(71) Applicant: Mitsubishi Electric Corporation, Tokyo (JP)

(72) Inventor: Tomohiro Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/296,746

(22) PCT Filed: Mar. 1, 2019

(86) PCT No.: PCT/JP2019/008171
§ 371 (c)(1),
(2) Date: May 25, 2021

(87) PCT Pub. No.: WO2020/178912
PCT Pub. Date: Sep. 10, 2020

(65) Prior Publication Data
US 2022/0026867 A1   Jan. 27, 2022

(51) Int. Cl.
*G05B 19/042* (2006.01)
(52) U.S. Cl.
CPC .... *G05B 19/042* (2013.01); *G05B 2219/2614* (2013.01)
(58) Field of Classification Search
CPC ........... G05B 19/042; G05B 2219/2614; F24F 11/50; F24F 11/63
See application file for complete search history.

(56) References Cited

U.S. PATENT DOCUMENTS

| 9,644,857 B1* | 5/2017 | Ashgriz | G06T 19/00 |
| 2009/0030555 A1* | 1/2009 | Gray | F24F 11/62 165/200 |

(Continued)

FOREIGN PATENT DOCUMENTS

| JP | 2010-014350 A | 1/2010 |
| JP | 5460891 B2 | 4/2014 |

(Continued)

OTHER PUBLICATIONS

Rhee et al. (Kyu-Nam Rhee, Mi-Su Shin, Sun-Ho Choi, Thermal uniformity in an open plan room with an active chilled beam system and conventional air distribution systems, Feb. 7, 2015, ELSEVIER, Energy and Building 93 (2015) pp. 236-248) (Year: 2015).*

(Continued)

*Primary Examiner* — Michael W Choi
(74) *Attorney, Agent, or Firm* — Posz Law Group, PLC

(57) ABSTRACT

An air condition control device includes a calculating circuitry to calculate a control influence degree, intended for controlling air condition changing devices, at each of control points in a room space on the basis of positional information that indicates a position where each of the air condition changing devices is located, influence degree information that indicates an influence degree of an air condition exerted on each of locations by each of the air condition changing devices, and running condition information that indicates a running condition of each of the air condition changing devices. The control influence degree is an influence degree of an air condition exerted by the air condition changing devices. The air condition control device also includes a controlling circuit to control the air condition changing devices to increase the control influence degree at a control point, which is relatively low.

8 Claims, 16 Drawing Sheets

(56) References Cited

U.S. PATENT DOCUMENTS

2013/0289778 A1   10/2013  Ishizaka
2014/0081467 A1*  3/2014  Sato .................... F24F 11/30
                                                            700/276
2015/0045967 A1*  2/2015  Mori ................... F24F 11/62
                                                            700/277
2015/0293540 A1* 10/2015  Izumihara ............ F24F 11/30
                                                             700/276

FOREIGN PATENT DOCUMENTS

WO      2014/084145 A1   6/2014
WO      2014/084145 A1  10/2016

OTHER PUBLICATIONS

International Search Report of the International Searching Authority dated May 14, 2019 for the corresponding International application No. PCT/JP2019/008171.

* cited by examiner

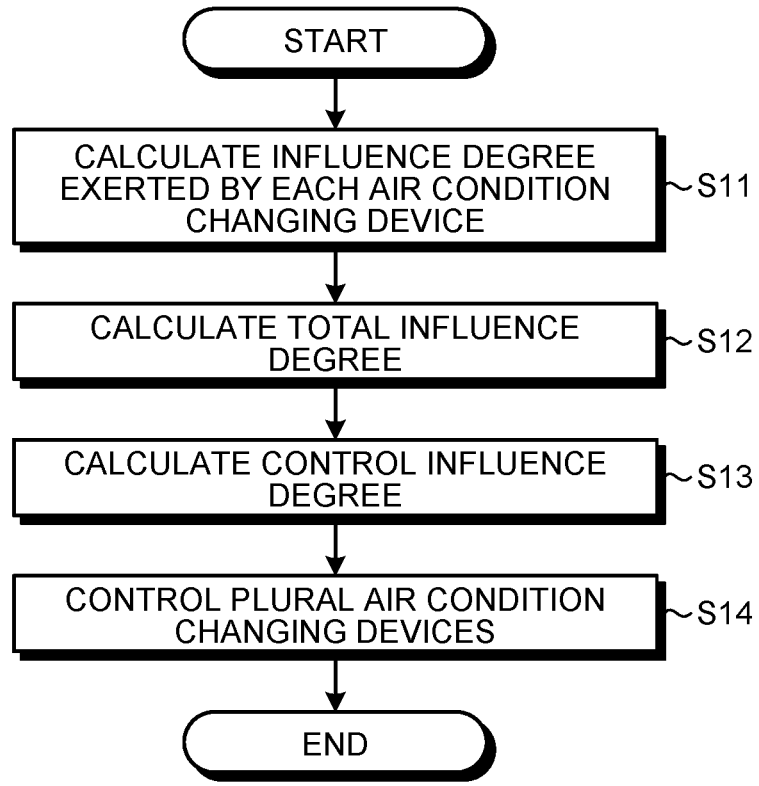
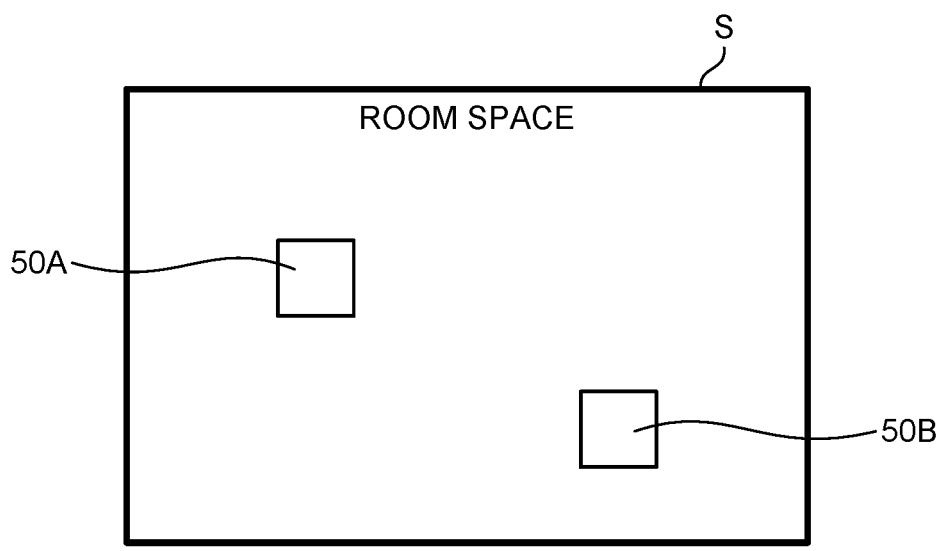

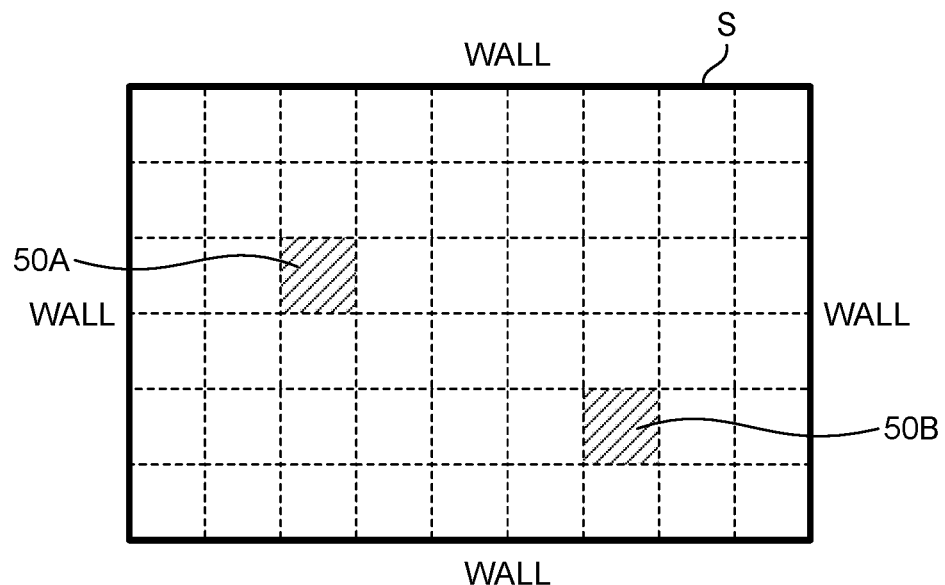

FIG.9

| 0 | 0 | 0 | 1 | 0 | 0 | 0 |
|---|---|---|---|---|---|---|
| 0 | 0 | 1 | 2 | 1 | 0 | 0 |
| 0 | 0 | 1 | 3 | 1 | 0 | 0 |
| - | - | - | 3 | - | - | - |

FIG.10

| 0 | 1 | 0.5 | 0.5 | 0 | 0 | 0 |
|---|---|---|---|---|---|---|
| 0 | 1.5 | 1.5 | 1.5 | 0 | 0 | 0 |
| 0 | 0.5 | 1.5 | 2 | 0 | 0 | 0 |
| - | - | - | 3 | - | - | - |

FIG.11

| 0 | 0 | 0 | 0.5 | 0.5 | 1 | 0 |
|---|---|---|---|---|---|---|
| 0 | 0 | 0 | 1.5 | 1.5 | 1.5 | 0 |
| 0 | 0 | 0 | 2 | 1.5 | 0.5 | 0 |
| - | - | - | 3 | - | - | - |

FIG.18
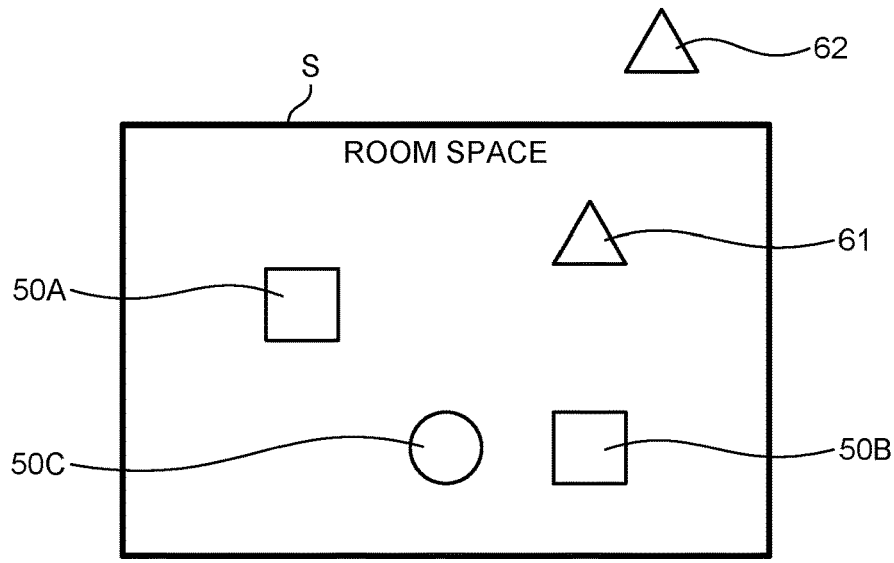
FIG.19
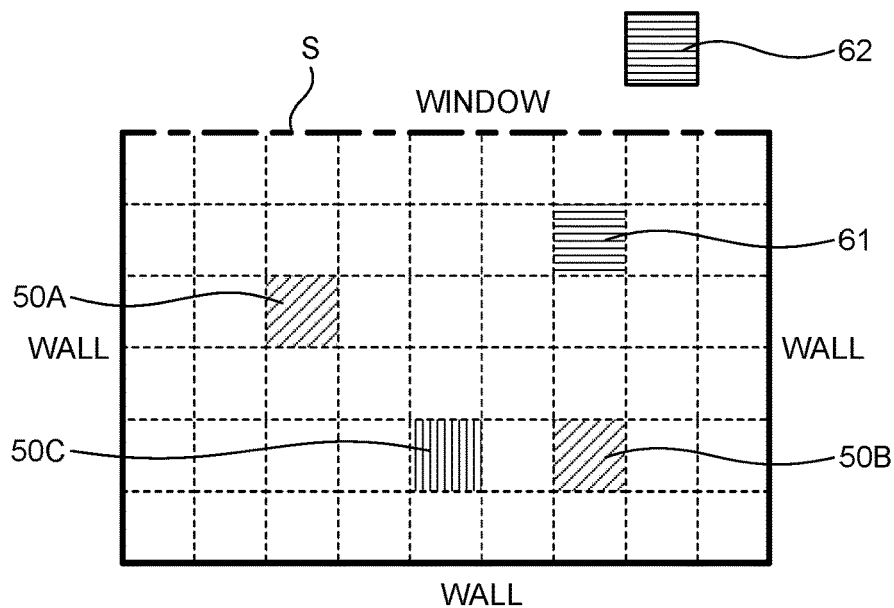
FIG.20
| 0 | -0.5 | 0 |
|---|---|---|
| -0.5 | -1 | -0.5 |
| 0 | -0.5 | 0 |

|   |   |   |   |   |   |   |   |   |   |   |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 1 | 0 | 0 | 0 |
| 0 | 0 | 0 | 0 | 0 | 0 | 0 | 0 | 0 | 0 | 0 |
| 0 | 0 | 0 | 0 | 0 | -0.5 | 0 | 0 | 0 | 0 | 0 |
| 0 | 0 | 0 | 0 | -0.5 | -1 | -0.5 | 0 | 0 | 0 | 0 |
| 0 | 0 | 0 | 0 | 0 | -0.5 | 0 | 0 | 0 | 0 | 0 |
| 0 | 0 | 0 | 0 | 0 | 0 | 0 | 0 | 0 | 0 | 0 |

FIG.24

| -0.5 | 0.8 | 1.8 | 0.8 | -0.5 | -0.5 | -0.5 | -0.5 | -0.5 |
|------|-----|-----|-----|------|------|------|------|------|
| 1.3 | 2 | 3 | 2 | 1 | 0 | 1 | 0 | 0 |
| 2.3 | 3 | 3 | 3 | 2 | 2 | 2 | 1 | 0 |
| 1.3 | 2 | 3 | 2 | 1.5 | 2 | 3 | 2 | 1.3 |
| 0 | 1 | 2 | 1.5 | 1 | 2.5 | 3 | 3 | 2.3 |
| 0 | 0 | 1 | 0 | 0.8 | 3 | 4.3 | 3 | 1.7 |

| OUTSIDE AIR TEMPERATURE - ROOM TEMPERATURE (COOLING OR DRYING) ROOM TEMPERATURE - OUTSIDE AIR TEMPERATURE (HEATING) | CORRECTION VALUE |
|---|---|
| LESS THAN 5°C | 0 |
| EQUAL TO OR GREATER THAN 5°C AND LESS THAN 10°C | -0.5 |
| EQUAL TO OR GREATER THAN 10°C | -1 |

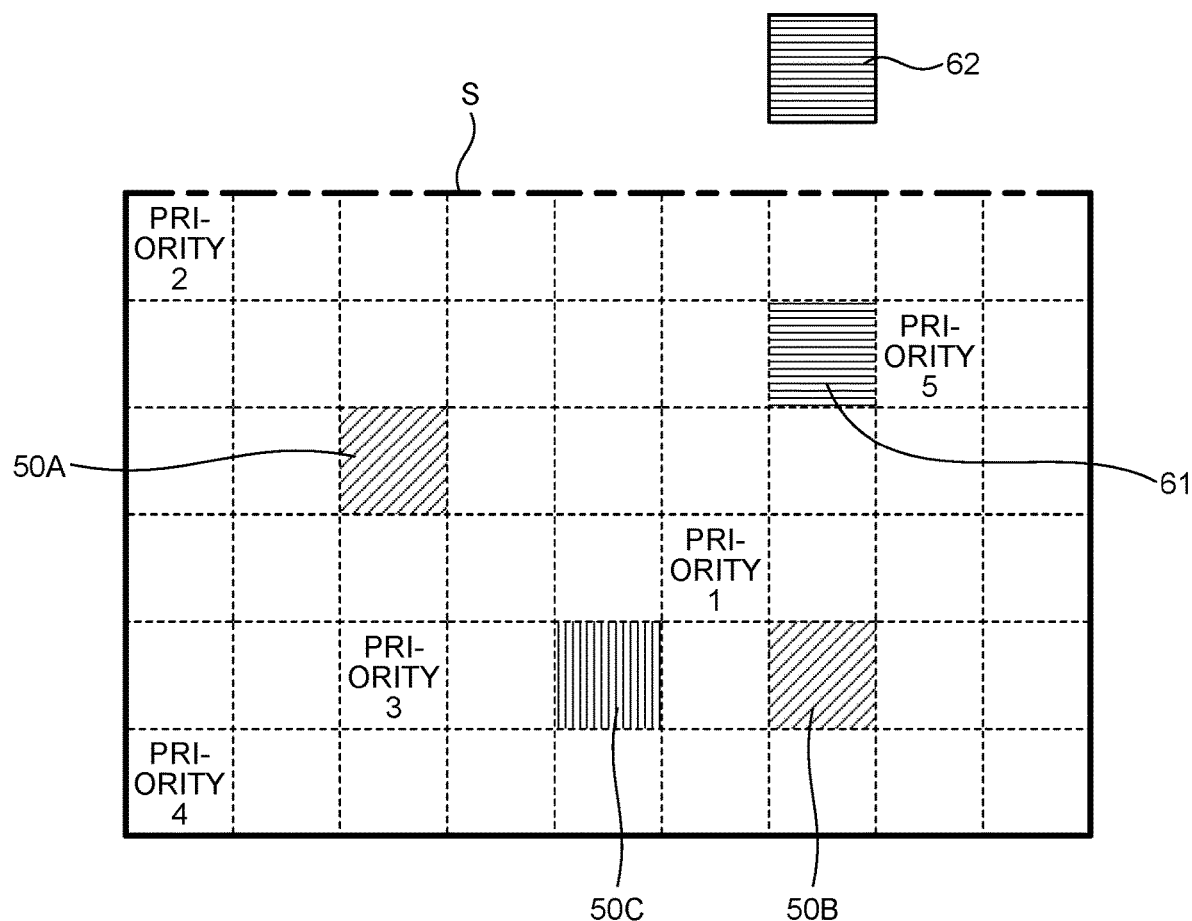

AIR CONDITION CONTROL DEVICE

CROSS REFERENCE TO RELATED APPLICATION

This application is a U.S. national stage application of International Patent Application No. PCT/JP2019/008171 filed on Mar. 1, 2019, the disclosure of which is incorporated herein by reference.

TECHNICAL FIELD

The present invention relates to an air condition control device that controls an air condition changing device that can change the air condition.

BACKGROUND

There is a case where a plurality of air condition changing devices, each of which can change the air condition, are located in a room space. Thus, a technique for controlling the air condition changing devices is conventionally proposed. For example, the room space is a space in an office. The air condition changing device is, for example, an air conditioner. A technique is conventionally proposed in which, on the basis of the difference between environmental information detected at a location where a person is present by a sensor, and environmental information detected by a related device that influences the environment at the above location, a target value of the environmental information to be used for the environmental control by the related device is corrected so that the environmental information at the location where a person is present is controlled automatically to become closer to the target value (see, for example, Patent Literature 1).

PATENT LITERATURE

Patent Literature 1: Japanese Patent No. 5460891

The technique disclosed in Patent Literature 1 controls the environmental information at a location where a person is present such that the environmental information becomes closer to the target value, however, the control is not executed on the entirety of the room space. There is thus a possibility for this technique to cause a nonuniform temperature in the room space. In view of the above, when a person moves within the room space, or when multiple persons are present in the room space, this technique impairs the comfort of the air condition for one or more persons.

SUMMARY

The present invention has been made in view of the above, and an object of the present invention is to provide an air condition control device that prevents the comfort of the air condition in a room space from being impaired in its entirety in a case where a plurality of air condition changing devices, each of which can change the air condition, are located in the room space.

In order to solve the above problems and achieve the object, an air condition control device according to the present invention includes a storage unit to store therein positional information that indicates a position where each of a plurality of air condition changing devices is located in a room space, each of the air condition changing devices being able to change an air condition. The storage unit further stores therein influence degree information that indicates an influence degree of an air condition exerted on each of a plurality of locations by each of the air condition changing devices, the influence degree being an influence degree under each running condition, and running condition information that indicates a running condition of each of the air condition changing devices. The air condition control device according to the present invention further includes a calculation unit to calculate, when the room space is divided into a plurality of regions with equal areas, a total influence degree on each of the regions on a basis of the positional information, the influence degree information, and the running condition information stored in the storage unit, the total influence degree being an influence degree of an air condition exerted by the air condition changing devices. The calculation unit calculates a control influence degree, intended for controlling the air condition changing devices, at each of a plurality of control points in the room space on a basis of the total influence degree calculated for each of the regions, the control influence degree being an influence degree of an air condition exerted by the air condition changing devices. The air condition control device according to the present invention further includes a control unit to control the air condition changing devices so as to increase the control influence degree at a control point, which is relatively low among the control influence degrees at the control points calculated by the calculation unit.

The air condition control device according to the present invention has an effect where it is possible to prevent the comfort of the air condition in a room space from being impaired in its entirety in a case where a plurality of air condition changing devices, each of which can change the air condition, are located in the room space.

BRIEF DESCRIPTION OF DRAWINGS

FIG. 5 is a flowchart illustrating an operational procedure for the air condition control device according to the first embodiment.

FIG. 6 is a plan view schematically illustrating a state in which two air condition changing devices are located in a room space.

FIG. 7 is a diagram illustrating a state in which each of the two air condition changing devices is located in the room space when the room space is divided into a plurality of regions with equal areas.

FIG. 8 is an explanatory diagram of an influence degree exerted by a single air condition changing device.

FIG. 9 is a first diagram for explaining an influence degree of air blown from one of outlets of a single air condition changing device.

FIG. 10 is a second diagram for explaining the influence degree of air blown from one of the outlets of a single air condition changing device.

FIG. 11 is a third diagram for explaining the influence degree of air blown from one of the outlets of a single air condition changing device.

FIG. 14 is a second diagram illustrating an example of the influence degree on each of the regions when air blown from each outlet of a single air condition changing device is directed forward.

FIG. 15 is a diagram illustrating an example of a total influence degree of the air condition exerted by two air condition changing devices.

FIG. 18 is a plan view schematically illustrating a state in which three air condition changing devices are located in the room space.

FIG. 19 is a diagram illustrating a state in which each of the three air condition changing devices is located in the room space when the room space is divided into a plurality of regions with equal areas.

FIG. 20 is an explanatory diagram of an influence degree of the air condition exerted by a ventilation fan.

FIG. 21 is a third diagram illustrating the influence degree on each of the regions when air blown from each outlet of a single air condition changing device is directed forward.

FIG. 22 is a fourth diagram illustrating the influence degree on each of the regions when air blown from each outlet of a single air condition changing device is directed forward.

FIG. 23 is a diagram illustrating an influence degree on each of the regions when a single air condition changing device is a ventilation fan.

FIG. 24 is a diagram illustrating an example of a total influence degree of the air condition exerted by three air condition changing devices.

FIG. 27 is a diagram illustrating an example of the priority to be used for determining to control the air condition at some of the control points in the room space.

FIG. 28 is a diagram illustrating an example of a relation between the correction value and the priority to be used when the calculation unit in an air condition control device according to a third embodiment corrects a total influence degree.

DETAILED DESCRIPTION

An air condition control device according to embodiments of the present invention will be described in detail below with reference to the accompanying drawings. The present invention is not limited to the embodiments.

First Embodiment

Figure 1:
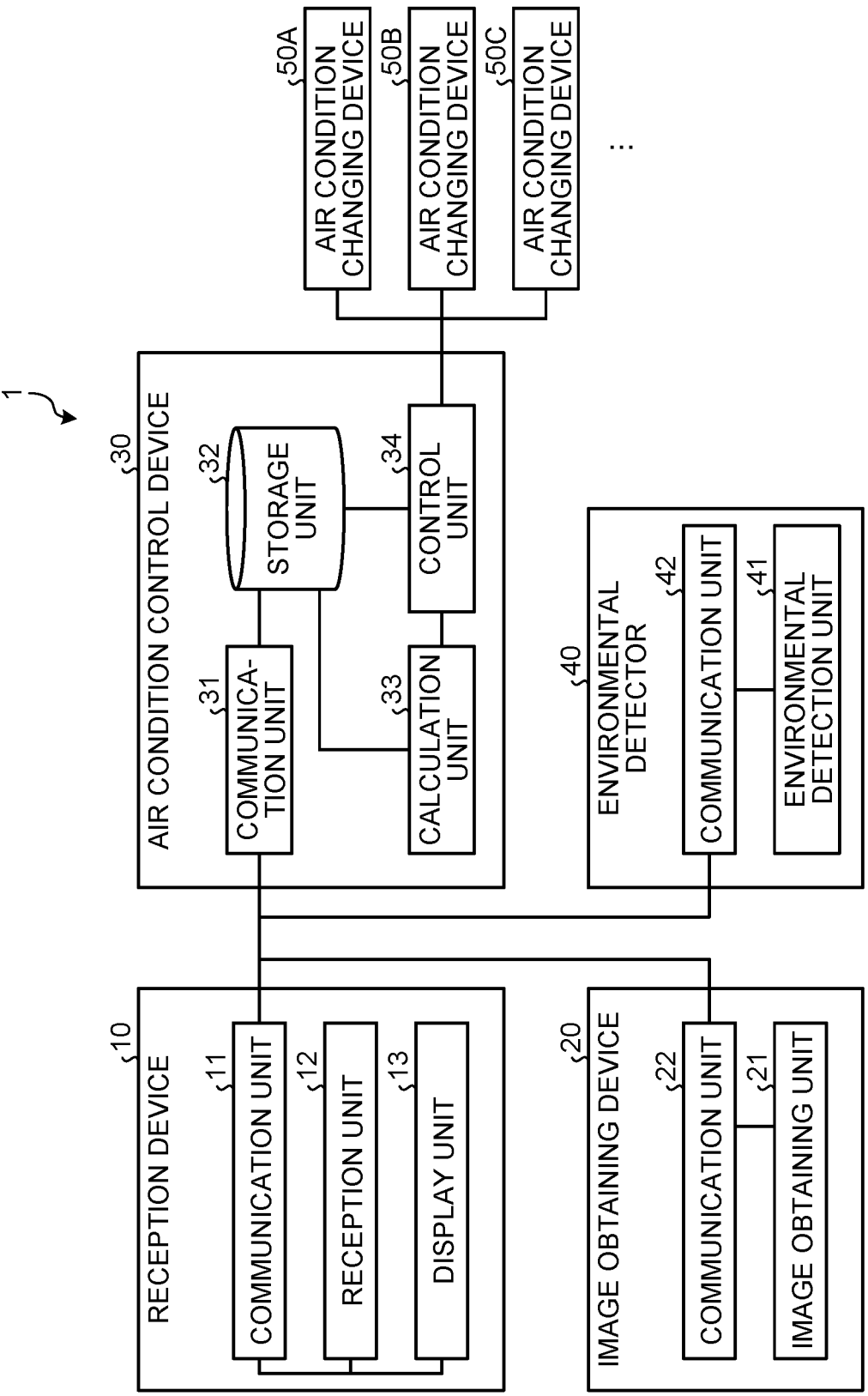
FIG. 1 is a diagram illustrating a configuration of an air condition control system according to a first embodiment.

FIG. 1 is a diagram illustrating a configuration of an air condition control system 1 according to a first embodiment. The air condition control system 1 controls an air condition changing device that can change the air condition. Specifically, the air condition control system 1 controls a plurality of air condition changing devices. Each of the air condition changing devices is a target device to be controlled. In other words, each of the air condition changing devices is a control target device.

Each of the air condition changing devices is located in a room space, and is an air conditioner, a ventilation fan, a heater, a humidifier, or a dehumidifier, for example. The room space is a target space where its air condition is controlled. For example, the room space is a space in an office. FIG. 1 illustrates an air condition changing device 50A, an air condition changing device 50B, and an air condition changing device 50C. The air condition changing devices 50A, 50B, and 50C are an example of a plurality of air condition changing devices.

The air condition control system 1 includes a reception device 10 to receive information input by a user and an operation performed by a user, an image obtaining device 20 to obtain an image of the room space, an air condition control device 30 to control a plurality of air condition changing devices, and an environmental detector 40 to obtain environmental information.

The reception device 10 includes a communication unit 11 to communicate with the air condition control device 30, a reception unit 12 to receive information input by a user and an operation performed by a user, and a display unit 13 to display information. The communication unit 11 transmits information received by the reception unit 12 and information on the operation performed by a user to the air condition control device 30. The communication unit 11 receives information to be displayed by the display unit 13 from the air condition control device 30. For example, the display unit 13 displays information received by the communication unit 11 from the air condition control device 30. The display unit 13 is, for example, a liquid-crystal display device.

The image obtaining device 20 includes an image obtaining unit 21 to obtain an image of the room space, and a communication unit 22 to communicate with the air condition control device 30. For example, the communication unit 22 transmits information that constitutes an image obtained by the image obtaining unit 21 to the air condition control device 30. The image obtaining device 20 is, for example, a camera or a thermosensor.

The air condition control device 30 includes a communication unit 31 to communicate with the reception device 10, the image obtaining device 20, and the environmental detector 40, and a storage unit 32 to store information therein. The storage unit 32 is, for example, a semiconductor memory. The air condition control device 30 further includes a calculation unit 33 to calculate a control influence degree intended for controlling the plurality of air condition changing devices, and a control unit 34 to control the air condition changing devices on the basis of a control influence degree calculated by the calculation unit 33. The control influence degree is described later. The storage unit 32, the calculation unit 33, and the control unit 34 are also described later in detail.

The environmental detector 40 includes an environmental detection unit 41 to obtain environmental information, and a communication unit 42 to transmit environmental information obtained by the environmental detection unit 41 to the air condition control device 30. The environmental detector 40 is, for example, a temperature sensor. For example, the environmental detection unit 41 obtains environmental information that indicates a temperature inside the room space. For example, the environmental detection unit 41 obtains environmental information that indicates a temperature outside the room space.

The air condition control device 30 communicates with the reception device 10, the image obtaining device 20, and the environmental detector 40 through, for example, a wired or wireless communication network. It is allowable that this communication is performed through a device located somewhere along a communication path.

Next, the storage unit 32, the calculation unit 33, and the control unit 34 included in the air condition control device 30 are described. The storage unit 32 stores therein positional information that indicates the position where each of the air condition changing devices is located in the room space. The storage unit 32 further stores therein influence degree information that indicates an influence degree of the air condition exerted on each of locations by each of the air condition changing devices, that is, an influence degree under each running condition. Furthermore, the storage unit 32 stores therein running condition information that indicates the running condition of each of the air condition changing devices.

When the room space is divided into a plurality of regions with equal areas, the calculation unit 33 calculates a total influence degree on each of the regions on the basis of the positional information, the influence degree information, and the running condition information stored in the storage unit 32. The total influence degree is an influence degree of the air condition exerted by the air condition changing devices. On the basis of the total influence degree calculated for each of the regions, the calculation unit 33 calculates a control influence degree, intended for controlling the air condition changing devices, at each of control points in the room space. The control influence degree is an influence degree of the air condition exerted by the air condition changing devices. The control points are different from the regions.

The control unit 34 controls the air condition changing devices so as to increase the control influence degree at a control point, which is relatively low among the control influence degrees at the control points calculated by the calculation unit 33. The storage unit 32, the calculation unit 33, and the control unit 34 are described later again.

Figure 2:
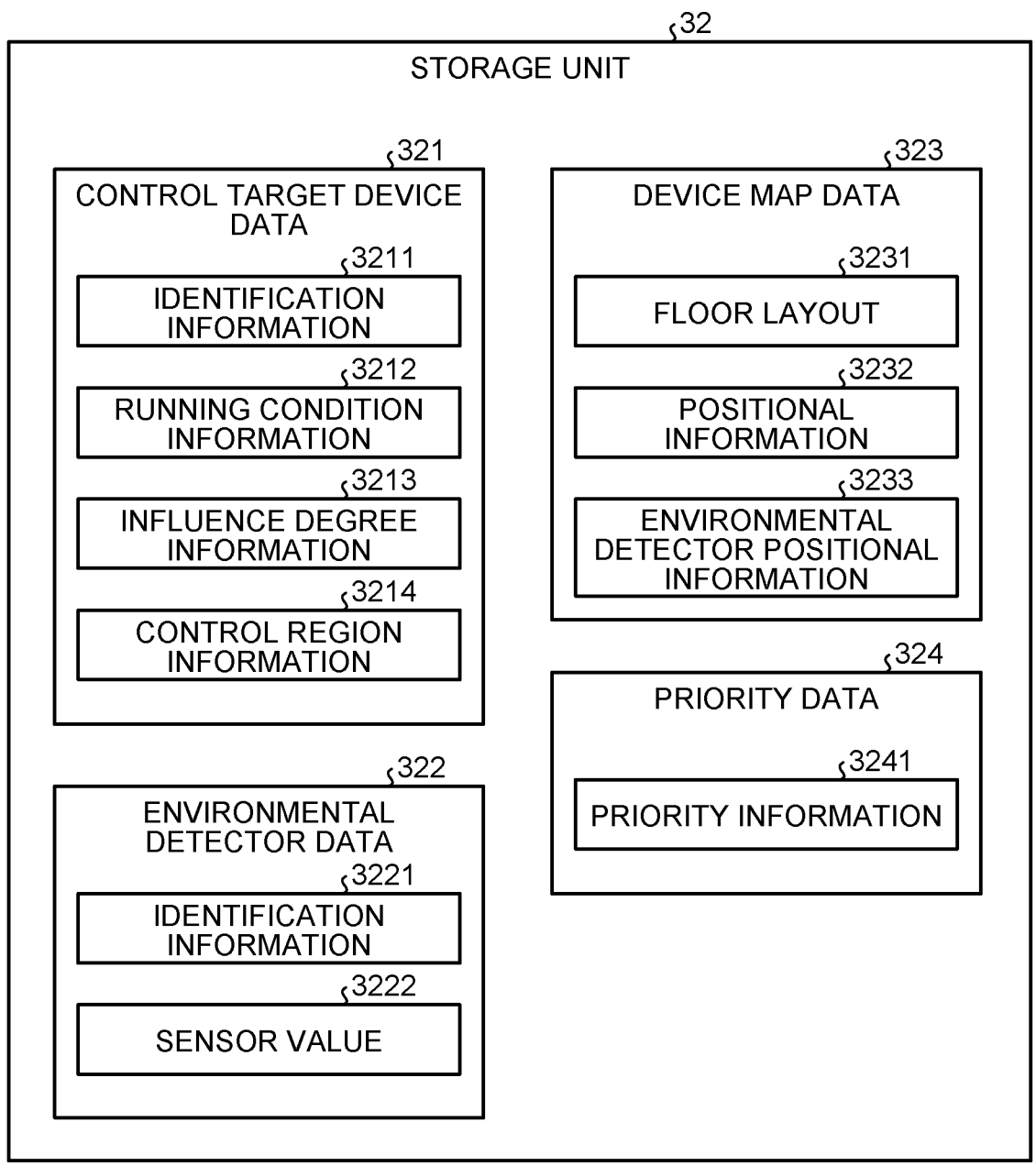
FIG. 2 is an explanatory diagram of information to be stored in a storage unit included in an air condition control device according to the first embodiment.

Next, information to be stored in the storage unit 32 is described. FIG. 2 is an explanatory diagram of information to be stored in the storage unit 32 included in the air condition control device 30 according to the first embodiment. The storage unit 32 stores therein control target device data 321, environmental detector data 322, device map data 323, and priority data 324.

The control target device data 321 includes identification information 3211 that identifies each of the air condition changing devices that are a plurality of control target devices. Examples of the air condition changing devices are the air condition changing devices 50A, 50B, and 50C. The identification information 3211 is, for example, information that indicates a part or the whole of the type, the model name, and the serial number of the air condition changing device. The control target device data 321 further includes running condition information 3212 that indicates the running condition of each of the air condition changing devices. For example, in a case where the air condition changing device is an air conditioner, the running condition refers to a set temperature or an air direction.

The control target device data 321 further includes influence degree information 3213 that indicates an influence degree of the air condition exerted on each of locations by each of the air condition changing devices, that is, an influence degree under each running condition. The control target device data 321 further includes control region information 3214 that indicates a control region for each of the air condition changing devices. For example, in a case where the air condition changing device is an air conditioner, the control region refers to a region where its air condition is changed by running of the air conditioner.

The environmental detector data 322 includes identification information 3221 that identifies the environmental detector 40. The identification information 3221 is, for example, information that indicates one or both of the model name and the serial number of the environmental detector 40. The environmental detector data 322 further includes a sensor value 3222 that is a value detected by the environmental detector 40. For example, in a case where the environmental detector 40 is a temperature sensor, the sensor value 3222 refers to information that indicates a temperature detected by the temperature sensor.

The device map data 323 includes floor layout 3231 of the room space, positional information 3232 that indicates a position where each of the air condition changing devices is located in the room space, and environmental detector positional information 3233 that indicates a position where the environmental detector 40 is located. The priority data 324 includes priority information 3241 that indicates a priority to be used for determining to control the air condition at some of the control points.

Figure 3:
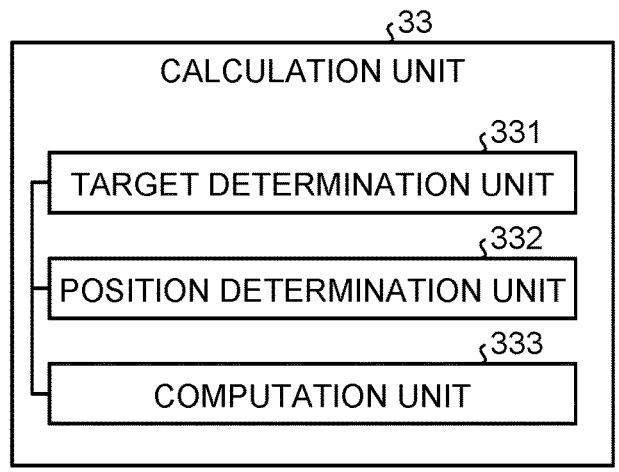
FIG. 3 is a diagram illustrating a configuration of a calculation unit included in the air condition control device according to the first embodiment.

Next, the calculation unit 33 is described. FIG. 3 is a diagram illustrating a configuration of the calculation unit 33 included in the air condition control device 30 according to the first embodiment. The calculation unit 33 includes a target determination unit 331 to analyze an image obtained by the image obtaining device 20, and to determine an object that is present in the room space. For example, the object is a wall or a window that forms the room space. The wall and the window are examples of a partition part that forms the room space.

The calculation unit 33 further includes a position determination unit 332 to analyze an image obtained by the image obtaining device 20, and to determine the position of the object, determined by the target determination unit 331, in the room space, and a computation unit 333 to calculate an influence degree exerted by each of the air condition changing devices in the room space, and to determine a control method for controlling the air condition changing devices.

Figure 4:
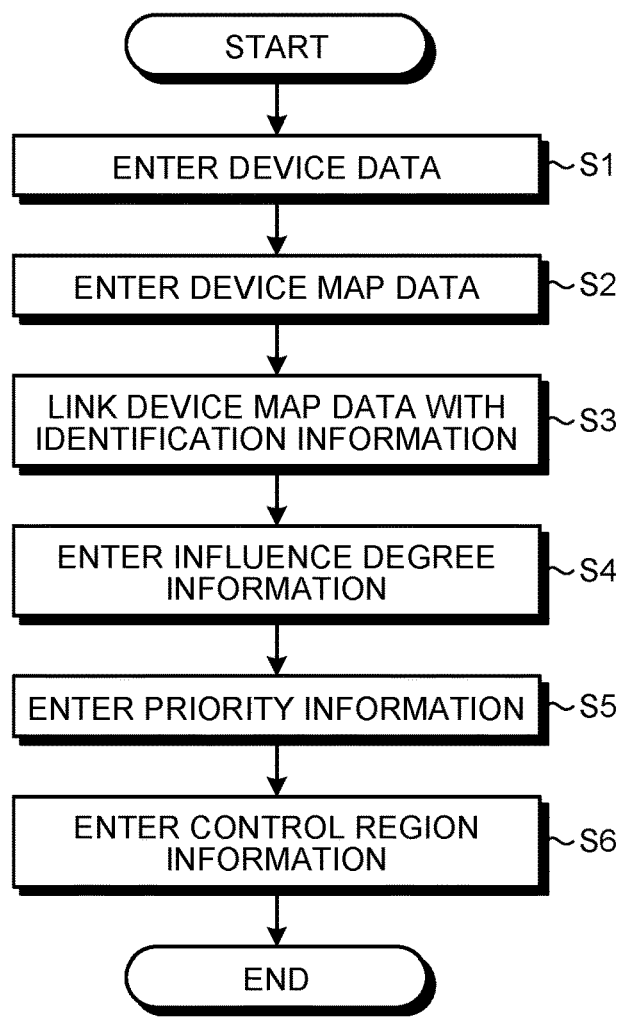
FIG. 4 is a flowchart illustrating an operational procedure for the initial settings in the air condition control system according to the first embodiment.

Next, operation of the air condition control system 1 according to the first embodiment is described. First, operation of the air condition control system 1 to perform the initial settings is described. FIG. 4 is a flowchart illustrating an operational procedure for the initial settings in the air condition control system 1 according to the first embodiment. A user inputs the identification information 3211 that identifies the air condition changing device, and the identification information 3221 that identifies the environmental detector 40 to the reception device 10.

The reception unit 12 in the reception device 10 receives the identification information 3211 and the identification information 3221 input by the user. The communication unit 11 in the reception device 10 transmits the identification information 3211 and the identification information 3221 to the air condition control device 30. In the air condition control device 30, the communication unit 31 receives the identification information 3211 and the identification information 3221, and the storage unit 32 stores the identification information 3211 and the identification information 3221 therein (S1). The storage unit 32 stores the identification information 3211 and the identification information 3221 therein at Step S1, which is described as "ENTER DEVICE DATA" in FIG. 4.

Next, a user inputs, to the reception device 10, the floor layout 3231 in the room space, the positional information 3232 that indicates the position where each of the air condition changing devices is located in the room space, and the environmental detector positional information 3233 that indicates the position where the environmental detector 40 is located. The reception unit 12 in the reception device 10 receives the floor layout 3231, the positional information 3232, and the environmental detector positional information 3233 input by the user.

The communication unit 11 in the reception device 10 transmits the floor layout 3231, the positional information 3232, and the environmental detector positional information 3233 to the air condition control device 30. In the air condition control device 30, the communication unit 31 receives the floor layout 3231, the positional information 3232, and the environmental detector positional information 3233, and the storage unit 32 stores therein the floor layout 3231, the positional information 3232, and the environmental detector positional information 3233 (S2). That is, the storage unit 32 stores the positional information 3232 therein on the basis of information input to the reception device 10 that receives information input by a user. The storage unit 32 stores therein the floor layout 3231, the positional information 3232, and the environmental detector positional information 3233 at Step S2, which is described as "ENTER DEVICE MAP DATA" in FIG. 4.

It is allowable at Step S2 that a user causes the display unit 13 to display the floor layout in the room space on the basis of the floor layout 3231, and inputs, on the displayed floor layout, information that indicates the position where each of the air condition changing devices is located, and information that indicates the position where the environmental detector 40 is located. Further, it is allowable that a user inputs, on the displayed floor layout, a mark that indicates each of the air condition changing devices, and a mark that indicates the environmental detector 40. Furthermore, it is allowable that a user inputs, on the displayed floor layout, information that indicates one or both of the wall and the window that form the room space.

It is allowable at Step S2 that on the basis of the image of the room space obtained by the image obtaining device 20, the calculation unit 33 calculates the floor layout, the position where each of the air condition changing devices is located, and the position where the environmental detector 40 is located. To be more specific, it is allowable that the calculation unit 33 generates device map data in which information that indicates the position where each of the air condition changing devices is located, and information that indicates the position where the environmental detector 40 is located are input to the floor layout.

It is allowable that the calculation unit 33 inputs, to the device map data, information that indicates one or both of the wall and the window. In that case, the storage unit 32 stores therein the floor layout 3231, the positional information 3232, and the environmental detector positional information 3233 on the basis of results of the calculation performed by the calculation unit 33. To be more specific, the storage unit 32 stores therein the positional information 3232 calculated on the basis of an image obtained by the image obtaining device 20 that obtains an image of the room space. It is allowable that a user modifies the device map data generated by the calculation unit 33. In any of the cases at Step S2, the storage unit 32 stores therein the floor layout 3231, the positional information 3232, and the environmental detector positional information 3233.

Next, a user inputs first linking data and second linking data to the reception device 10. The first linking data is intended to link the identification information 3211 input at Step S1 with the positional information 3232 input at Step S2. The second linking data is intended to link the identification information 3221 input at Step S1 with the environmental detector positional information 3233 input at Step S2. The reception unit 12 in the reception device 10 receives the first linking data and the second linking data input by the user.

The communication unit 11 in the reception device 10 transmits the first linking data and the second linking data to the air condition control device 30. In the air condition control device 30, the communication unit 31 receives the first linking data and the second linking data, and the storage unit 32 stores the first linking data and the second linking data therein. The storage unit 32 links the identification information 3211 with the positional information 3232 on the basis of the first linking data, and links the identification information 3221 with the environmental detector positional information 3233 on the basis of the second linking data (S3). The storage unit 32 links the identification information 3211 with the positional information 3232, and links the identification information 3221 with the environmental detector positional information 3233 at Step S3, which is described as "LINK DEVICE MAP DATA WITH IDENTIFICATION INFORMATION" in FIG. 4.

Next, a user inputs influence degree information to the reception device 10. The influence degree information indicates an influence degree of the air condition exerted on each of locations by each of the air condition changing devices, that is, an influence degree under each running condition. The reception unit 12 in the reception device 10 receives the influence degree information input by the user. The communication unit 11 in the reception device 10 transmits the influence degree information to the air condition control device 30. In the air condition control device 30, the communication unit 31 receives the influence degree information, and the storage unit 32 stores the influence degree information therein (S4). That is, the storage unit 32 stores the influence degree information therein on the basis of information input to the reception device 10 that receives information input by the user. The storage unit 32 stores the influence degree information therein at Step S4, which is described as "ENTER INFLUENCE DEGREE INFORMATION" in FIG. 4.

It is allowable that the influence degree information is stored in the storage unit 32 in advance. In that case, a process at Step S4 is omitted. It is allowable that the storage unit 32 stores therein information that indicates the influence degree exerted by the air condition changing device on a device type-by-type basis in advance, and on the basis of the information stored in advance and the identification information 3211 that identifies the air condition changing device, the calculation unit 33 calculates an influence degree exerted by each of the air condition changing devices. Also in that case, the storage unit 32 stores the influence degree information therein at Step S4.

It is allowable that the storage unit 32 stores the running condition information 3212 therein on the basis of information input to the reception device 10 that receives information input by a user in the same manner as storing the influence degree information. For example, it is allowable that the storage unit 32 stores partition part information therein, that is information on the partition part that forms the room space, on the basis of information input to the reception device 10 that receives information input by a user in the same manner as storing the influence degree information.

Next, a user inputs the priority information 3241 to the reception device 10. The priority information 3241 indicates a priority to be used for determining to control the air condition at some of the control points. The reception unit 12 in the reception device 10 receives the priority information 3241 input by the user. The communication unit 11 in the reception device 10 transmits the priority information 3241 to the air condition control device 30. In the air condition control device 30, the communication unit 31 receives the priority information 3241, and the storage unit 32 stores the priority information 3241 therein (S5). The storage unit 32 stores the priority information 3241 therein at Step S5, which is described as "ENTER PRIORITY INFORMATION" in FIG. 4.

That is, the storage unit 32 stores the priority information 3241 therein on the basis of information input to the reception device 10 that receives information input by a user. The storage unit 32 further stores therein correction value information that indicates a correction value for each of priorities. It is allowable that the storage unit 32 stores the correction value information therein on the basis of information input to the reception device 10 in the same manner as storing the priority information 3241.

Next, a user inputs the control region information 3214 to the reception device 10. The control region information 3214 indicates a region where each of the air condition changing devices controls the air condition. The reception unit 12 in the reception device 10 receives the control region information 3214 input by the user. The communication unit 11 in the reception device 10 transmits the control region information 3214 to the air condition control device 30. In the air condition control device 30, the communication unit 31 receives the control region information 3214, and the storage unit 32 stores the control region information 3214 therein (S6). The storage unit 32 stores the control region information 3214 therein at Step S6, which is described as "ENTER CONTROL REGION INFORMATION" in FIG. 4.

It is allowable that the control region information 3214 is stored in the storage unit 32 in advance. In that case, a process at Step S6 is omitted. It is allowable that the storage unit 32 stores therein information that indicates the region where the air condition changing device controls the air condition on a device type-by-type basis in advance, and on the basis of the information stored in advance and the identification information 3211 that identifies the air condition changing device, the calculation unit 33 calculates a region where each of the air condition changing devices controls the air condition. Also in that case, the storage unit 32 stores the control region information 3214 therein at Step S6.

Next, operation of the air condition control device 30 to control a plurality of air condition changing devices is described. FIG. 5 is a flowchart illustrating an operational procedure for the air condition control device 30 according to the first embodiment. The calculation unit 33 obtains the control target device data 321 and the device map data 323 stored in the storage unit 32. When the room space is divided into a plurality of regions with equal areas, the calculation unit 33 calculates an influence degree of the air condition on each of the regions exerted by each of the air condition changing devices on the basis of the obtained data (S11).

The calculation unit 33 overlays the data on the influence degrees exerted by the air condition changing devices calculated at Step S11 with one another to calculate a total influence degree that is an influence degree of the air condition exerted by the air condition changing devices (S12).

On the basis of the total influence degree on each of the regions calculated at Step S12, the calculation unit 33 calculates a control influence degree, intended for controlling the air condition changing devices, at each of control points in the room space (S13). The control influence degree is an influence degree of the air condition exerted by the air condition changing devices. Specifically, a single set made up of four regions adjacent to each other on the plane has the center point that is defined as a single control point. The calculation unit 33 calculates a control influence degree at the single control point by averaging the respective total influence degrees on these four regions. The plane is, for example, a ceiling of the room space or a plane parallel to the ceiling. The four regions are included in a single square.

The control unit 34 controls the air condition changing devices so as to increase the control influence degree at a control point, which is relatively low among the control influence degrees at the control points calculated by the calculation unit 33 (S14).

Next, a specific example of the operation of the air condition control device 30 to control a plurality of air condition changing devices is described. FIG. 6 is a plan view schematically illustrating a state in which two air condition changing devices are located in a room space S. The two air condition changing devices are the air condition changing device 50A and the air condition changing device 50B. The room space S is, for example, a space in an office. Each of the air condition changing devices 50A and 50B is assumed to be an air conditioner. Further, the air conditioner is assumed to be formed with outlets oriented in four directions. Furthermore, the air condition changing device 50A and the air condition changing device 50B are assumed to be located on the ceiling of the room space S and located away from each other.

FIG. 7 is a diagram illustrating a state in which each of the two air condition changing devices is located in the room space S when the room space S is divided into a plurality of regions with equal areas. The two air condition changing devices are the air condition changing device 50A and the air condition changing device 50B. Each of the air condition changing devices 50A and 50B is illustrated by hatching. FIG. 7 illustrates an example in which the plane of the room space S is divided into six regions in the vertical direction and into nine regions in the horizontal direction, so that the room space S is made up of 54 regions. The plane is a ceiling of the room space S or a plane parallel to the ceiling. Each of the 54 regions is a square, and is defined by using the broken lines. FIG. 7 further illustrates information on the partition parts that form the room space S. Specifically, FIG. 7 illustrates that the room space S is formed by four walls. The walls are an example of the partition parts.

FIG. 8 is an explanatory diagram of the influence degree exerted by a single air condition changing device. FIG. 8 illustrates a state in which a single plane is divided into a plurality of squares, and the single air condition changing device is located at the center of the single plane. The single plane is a part of the ceiling of the room space S. A section where the single air condition changing device is located is illustrated by hatching. A numeral appearing in each of the squares indicates an influence degree of the air condition exerted on each of the locations of the squares by the single air condition changing device. As the numeral is larger, the influence degree is higher. FIG. 8 illustrates that the influence degree becomes lower as the square region is located further from the single air condition changing device. In FIG. 8, the influence degree is shown at four levels from 0 to 3. However, the influence degree is not limited to being shown at the four levels.

FIG. 9 is a first diagram for explaining the influence degree of air blown from one of the outlets of a single air condition changing device. Similarly to FIG. 8, FIG. 9 illustrates each of the regions formed into a square, illustrates a section where the single air condition changing device is located by hatching, and illustrates the influence degree by using a numeral. FIG. 9 illustrates an example of the influence degree when air blown from the one outlet is directed forward.

FIG. 10 is a second diagram for explaining the influence degree of air blown from one of the outlets of a single air condition changing device. Similarly to FIG. 8, FIG. 10 illustrates each of the regions formed into a square, illustrates a section where the single air condition changing device is located by hatching, and illustrates the influence degree by using a numeral. FIG. 10 illustrates an example of the influence degree when air blown from the one outlet is directed leftward.

FIG. 11 is a third diagram for explaining the influence degree of air blown from one of the outlets of a single air condition changing device. Similarly to FIG. 8, FIG. 11 illustrates each of the regions formed into a square, illustrates a section where the single air condition changing device is located by hatching, and illustrates the influence degree by using a numeral. FIG. 11 illustrates an example of the influence degree when air blown from the one outlet is directed rightward.

With reference to FIGS. 9 to 11, the descriptions have been made on the influence degree when air blown from one of the outlets of a single air condition changing device is directed toward each of the three directions. However, the flow direction of air blown from an outlet is not limited to three directions. It is allowable that the air is directed toward any of four or more directions. It is also allowable that the flow direction of the air changes not only in the leftward-rightward direction, but also changes in the upward-downward direction. As described above, the control target device data 321 stored in the storage unit 32 includes the running condition information 3212 that indicates a running condition of a control target device. One of the running conditions is the air direction. Conditions of the air direction include one or both of the leftward-rightward flow direction of air and the upward-downward flow direction of air.

Figure 12:
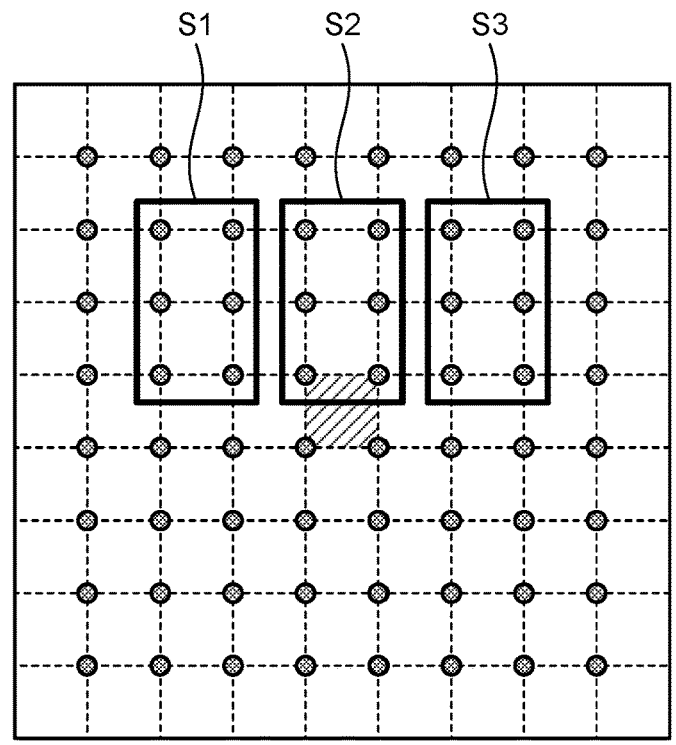
FIG. 12 is an explanatory diagram of an example of a plurality of control points.

FIG. 12 is an explanatory diagram of an example of a plurality of control points. When the room space S is divided into a plurality of square regions with equal areas, each of the control points is the center point of each set made up of four regions adjacent to each other. FIG. 12 illustrates each of the control points by a circle.

FIG. 12 further illustrates control region information that indicates a control region for a single air condition changing device. With reference to FIGS. 9 to 11, the descriptions have been made on the influence degree when air blown from one of the outlets of a single air condition changing device is directed toward each of the three directions. FIG. 12 illustrates control region information S1 when air blown from an outlet is directed leftward, control region information S2 when the air is directed forward, and control region information S3 when the air is directed rightward.

On the basis of the control target device data 321 and the device map data 323 stored in the storage unit 32, the calculation unit 33 in the air condition control device 30 calculates an influence degree of the air condition on each of the regions exerted by each of the air condition changing devices 50A and 50B.

Figure 13:
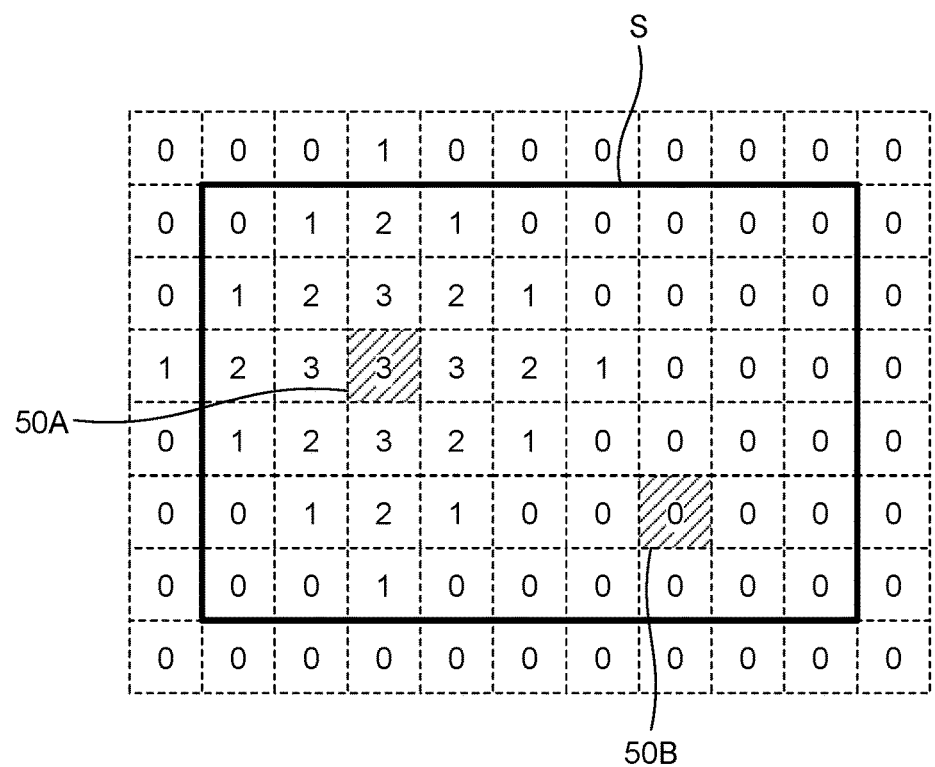
FIG. 13 is a first diagram illustrating an example of an influence degree on each of the regions when air blown from each outlet of a single air condition changing device is directed forward.

Assuming that air blown from each outlet of the air condition changing device 50A is directed forward, the calculation unit 33 calculates the influence degree on each of the regions illustrated in FIG. 13. FIG. 13 is a first diagram illustrating an example of the influence degree on each of the regions when air blown from each outlet of a single air condition changing device is directed forward. The single air condition changing device is the air condition changing device 50A. In FIG. 13, each of the regions is surrounded by the broken lines, and the influence degree on each of the regions is shown by a numeral. Some of the regions are positioned along the outer edge of the room space S. Each of these regions has one side or two sides illustrated by the solid line.

Figures 14, 15:
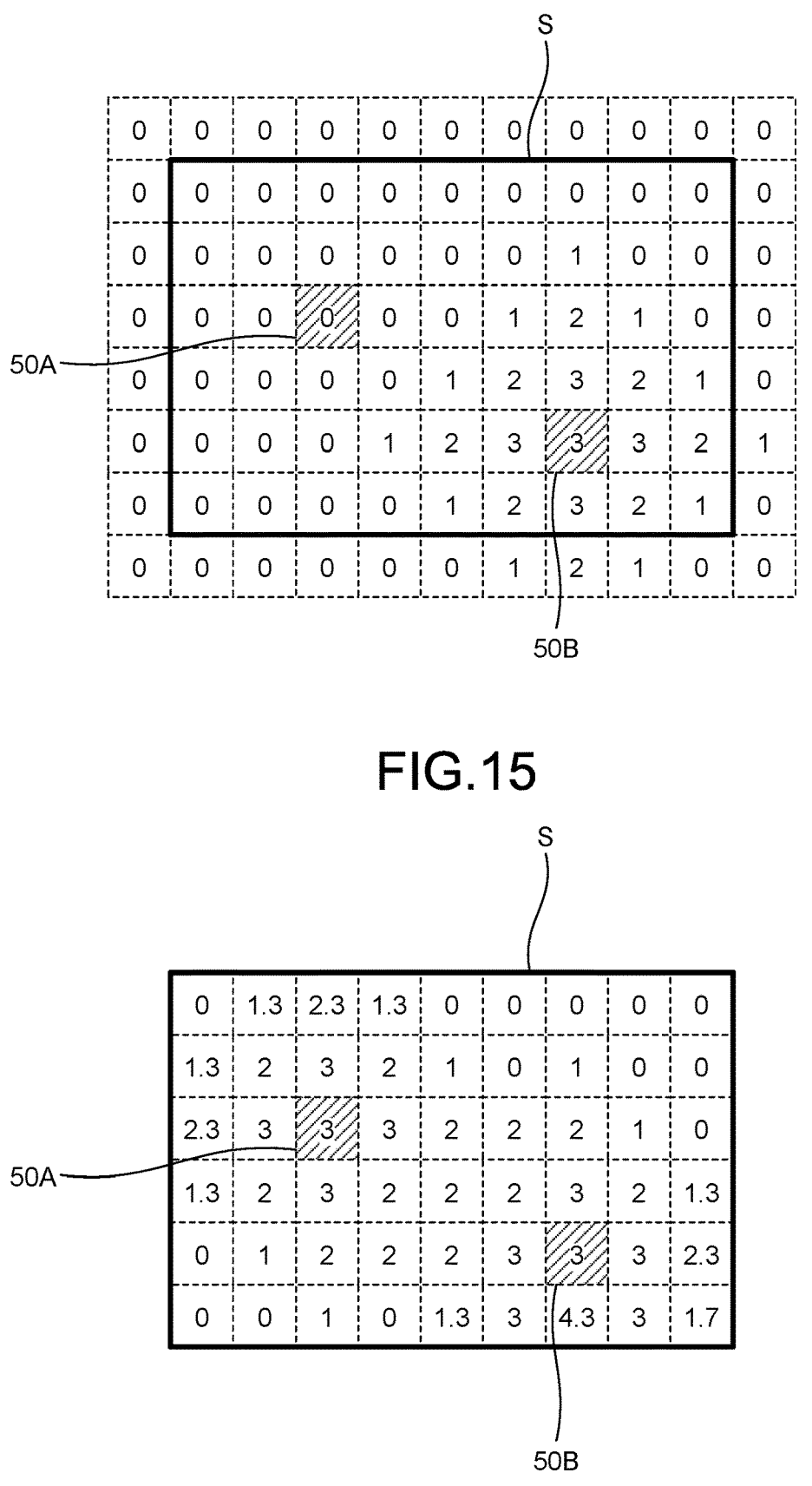

Assuming that air blown from each outlet of the air condition changing device 50B is directed forward, the calculation unit 33 calculates the influence degree on each of the regions illustrated in FIG. 14. FIG. 14 is a second diagram illustrating an example of the influence degree on each of the regions when air blown from each outlet of a single air condition changing device is directed forward. The single air condition changing device is the air condition changing device 50B. In FIG. 14, each of the regions is surrounded by the broken lines, and the influence degree on each of the regions is shown by a numeral. Some of the regions are positioned along the outer edge of the room space S. Each of these regions has one side or two sides illustrated by the solid line.

Next, the calculation unit 33 overlays the data on the influence degree of the air condition exerted by the air condition changing device 50A with the data on the influence degree of the air condition exerted by the air condition changing device 50B to calculate a total influence degree that is the influence degrees of the air condition exerted by the air condition changing devices 50A and 50B. Specifically, the calculation unit 33 overlays the data on the influence degree illustrated in FIG. 13 with the data on the influence degree illustrated in FIG. 14 to calculate the total influence degree. FIG. 15 is a diagram illustrating an example of the total influence degree of the air condition exerted by two air condition changing devices. The two air condition changing devices are the air condition changing device 50A and the air condition changing device 50B.

Figure 16:
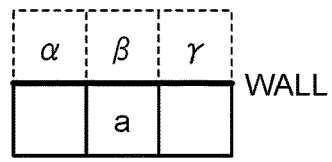
FIG. 16 is an explanatory diagram of a method for calculating a total influence degree when the calculation unit included in the air condition control device according to the first embodiment calculates the total influence degree on a region adjacent to a wall of the room space.

The calculation unit 33 calculates a total influence degree on a region adjacent to the wall of the room space S, taking into account the influence of the wall. FIG. 16 is an explanatory diagram of a method for calculating a total influence degree when the calculation unit 33 included in the air condition control device 30 according to the first embodiment calculates a total influence degree on a region adjacent to the wall of the room space S. To be more specific, FIG. 16 is an explanatory diagram of a method for correcting the total influence degree when the calculation unit 33 corrects the total influence degree on the region adjacent to the wall. The thick line in FIG. 16 illustrates a part of a single wall of the room space S.

A region assigned with a reference sign "a" is one of the regions adjacent to the wall in the room space S. The region that is a section assigned with a reference sign "α" is a first outside-of-wall region located on outside of the room space S. The region that is a section assigned with a reference sign "β" is a second outside-of-wall region located on outside of the room space S. The region that is a section assigned with a reference sign "γ" is a third outside-of-wall region located on outside of the room space S. The region "a" and the second outside-of-wall region "β" face each other with the wall interposed therebetween. The second outside-of-wall region "β" is interposed between the first outside-of-wall region "α" and the third outside-of-wall region "γ".

The influence degree on the region "a" is assumed to be a value "a" in a case where the data on the influence degree of the air condition exerted by the air condition changing device 50A is simply overlaid with the data on the influence degree of the air condition exerted by the air condition changing device 50B. The influence degree on the first outside-of-wall region "α" in this case is assumed to be a value "α". The influence degree on the second outside-of-wall region "β" in this case is assumed to be a value "β". The influence degree on the third outside-of-wall region "γ" in this case is assumed to be a value "γ".

The calculation unit 33 corrects the total influence degree having been calculated by using the influence degree of the air condition exerted by the air condition changing device 50A, and the influence degree of the air condition exerted by the air condition changing device 50B. Specifically, the calculation unit 33 corrects the total influence degree on the region "a" by using an expression "a+(α+β+γ)/3", taking into account the influence of the wall. That is, the calculation unit 33 corrects the total influence degree on the region "a" to a total influence degree obtained by using the expression "a+(α+β+γ)/3". In this manner, the calculation unit 33 corrects the total influence degree by using the partition part information stored in the storage unit 32.

Next, the calculation unit 33 calculates a control influence degree at each of the control points in the room space on the basis of the total influence degree on each of the regions. The calculation unit 33 calculates the control influence degree on the basis of the corrected total influence degrees. A single control point is the center point of a single set made up of four regions adjacent to each other. The four regions are included in a single square. The calculation unit 33 calculates a control influence degree at the single control point by averaging the respective total influence degrees on these four regions.

Figure 17:
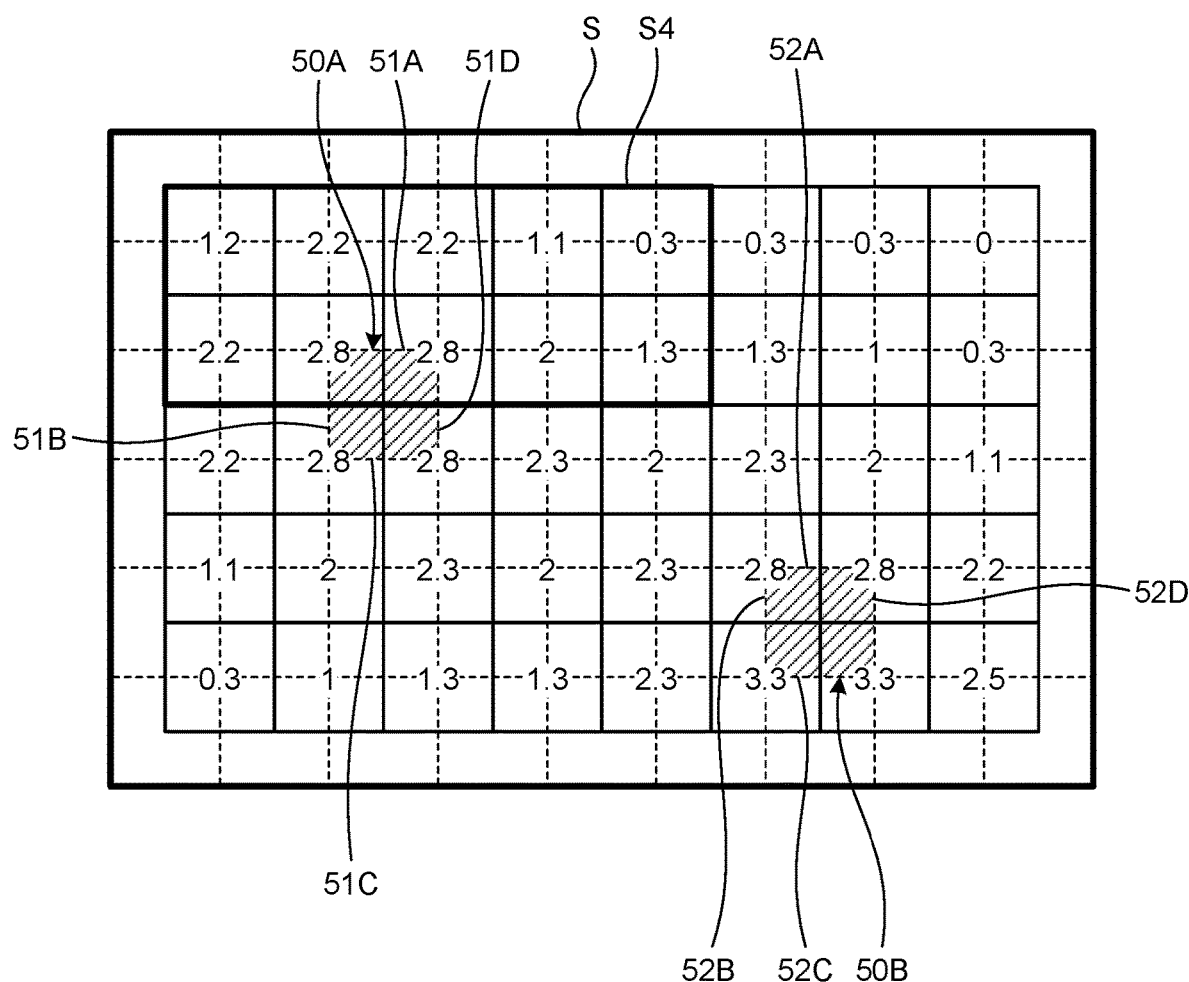
FIG. 17 is a diagram illustrating an example of a control influence degree at each of the control points in the room space calculated by the calculation unit included in the air condition control device according to the first embodiment.

FIG. 17 is a diagram illustrating an example of the control influence degree at each of the control points in the room space S calculated by the calculation unit 33 included in the air condition control device 30 according to the first embodiment. As illustrated in FIG. 17, the calculation unit 33 calculates the control influence degree at each of the control points in the room space S on the basis of the calculated total influence degrees.

FIG. 17 schematically illustrates the air condition changing device 50A and the air condition changing device 50B. In FIG. 17, the position of a first outlet of the air condition changing device 50A is denoted by a reference sign 51A. The position of a second outlet of the air condition changing device 50A is denoted by a reference sign 51B. The position of a third outlet of the air condition changing device 50A is denoted by a reference sign 51C. The position of a fourth outlet of the air condition changing device 50A is denoted by a reference sign 51D. In FIG. 17, the position of a first outlet of the air condition changing device 50B is denoted by a reference sign 52A. The position of a second outlet of the air condition changing device 50B is denoted by a reference sign 52B. The position of a third outlet of the air condition changing device 50B is denoted by a reference sign 52C. The position of a fourth outlet of the air condition changing device 50B is denoted by a reference sign 52D.

A rectangle illustrated by the thick line inside the room space S in FIG. 17 is a control range of the outlet 51A of the air condition changing device 50A. In other words, the control range of the outlet 51A covers the inside region of the rectangle illustrated by the thick line. In this control range, the lowest control influence degree is 0.3. The control point, at which the control influence degree is 0.3, is positioned on the right side relative to the outlet 51A. In view of this, the control unit 34 controls the air condition changing device 50A such that air blown from the outlet 51A is directed rightward.

The control unit 34 controls the air condition changing device 50A so as to increase the control influence degree at a control point, which is the lowest inside the control range of each of the outlets 51B, 51C, and 51D of the air condition changing device 50A. Specifically, the control unit 34 controls the air condition changing device 50A such that air blown from the outlet 51B is directed leftward, air blown from the outlet 51C is directed rightward, and air blown from the outlet 51D is directed leftward.

The control unit 34 controls the air condition changing device 50B in the same manner as controlling the air condition changing device 50A. Specifically, the control unit 34 controls the air condition changing device 50B such that air blown from the outlet 52A is directed rightward, air blown from the outlet 52B is directed rightward, air blown from the outlet 52C is directed rightward, and air blown from the outlet 52D is directed leftward.

As described above, when the room space S is divided into a plurality of regions with equal areas, the air condition control device 30 according to the first embodiment calculates an influence degree of the air condition exerted on each of the regions by each of the air condition changing devices. The air condition control device 30 overlays the data on the influence degrees exerted by the air condition changing devices with one another to calculate a total influence degree that is an influence degree of the air condition exerted by the air condition changing devices.

On the basis of the calculated total influence degree on each of the regions, the air condition control device 30 calculates a control influence degree, intended for controlling the air condition changing devices, at each of control points in the room space. The control influence degree is an influence degree of the air condition exerted by the air condition changing devices. The air condition control device 30 controls the air condition changing devices so as to increase the control influence degree at a control point, which is relatively low among the control influence degrees at the control points.

Therefore, the air condition control device 30 can prevent the comfort of the air condition in the room space S from being impaired in its entirety in a case where a plurality of air condition changing devices, each of which can change the air condition, are located in the room space S. For example, the air condition control device 30 can reduce the occurrence of a nonuniform temperature in the room space S in its entirety.

It is allowable that the control unit 34 in the air condition control device 30 regularly controls the air condition changing devices so as to increase the control influence degree at a control point, which is relatively low among the control influence degrees at the control points calculated by the calculation unit 33. This control can further prevent the comfort in the room space S from being impaired in its entirety.

Second Embodiment

In the example in the first embodiment, four partition parts forming the room space S are walls, and a plurality of air condition changing devices are two air condition changing devices including the air condition changing device 50A and the air condition changing device 50B. In a second embodiment, three of the four partition parts forming the room space S are walls, while one of the four partitions is a window, and a plurality of air condition changing devices are three air condition changing devices including the air condition changing device 50A, the air condition changing device 50B, and the air condition changing device 50C. In the second embodiment, features different from those of the first embodiment are mainly described.

As described above, in the second embodiment, one of the four partition parts forming the room space S is a window. Thus, the storage unit 32 stores partition part information therein, that is information on the window. The partition part information influences calculation of a total influence degree. In the second embodiment, the air condition changing devices include the air condition changing device 50C. The air condition changing device 50C is a ventilation fan.

FIG. 18 is a plan view schematically illustrating a state in which three air condition changing devices are located in the room space S. The three air condition changing devices are the air condition changing device 50A, the air condition changing device 50B, and the air condition changing device 50C. Each of the air condition changing devices 50A and 50B is an air conditioner. The air condition changing device 50C is a ventilation fan as described above. Inside the room space S, a first environmental detector 61 to detect the temperature inside the room space S is located. Outside the room space S, a second environmental detector 62 to detect the temperature outside the room space S is located. Each of the first environmental detector 61 and the second environmental detector 62 is a temperature sensor.

FIG. 19 is a diagram illustrating a state in which each of the three air condition changing devices is located in the room space S when the room space S is divided into a plurality of regions with equal areas. Three air condition changing devices are the air condition changing device 50A, the air condition changing device 50B, and the air condition changing device 50C. The air condition changing devices 50A and 50B are illustrated by hatching. The air condition changing device 50C is illustrated by the vertical lines.

FIG. 19 illustrates that the room space S is divided into six regions in the vertical direction and into nine regions in the horizontal direction, so that the room space S is made up of 54 regions. Each of the 54 regions is a square, and is defined by using the broken lines. FIG. 19 schematically illustrates each of the first environmental detector 61 and the second environmental detector 62. Each of the first environmental detector 61 and the second environmental detector 62 is illustrated by the horizontal lines. FIG. 19 further illustrates information on the partition parts that form the room space S. Specifically, FIG. 19 illustrates that the room space S is formed by three walls and one window. The walls and the window are an example of the partition parts.

FIG. 20 is an explanatory diagram of the influence degree of the air condition exerted by a ventilation fan. FIG. 20 illustrates a state in which the ventilation fan is located at the center of a range made up of nine square regions. The ventilation fan is illustrated by using the vertical lines. A numeral appearing in each of the nine square regions indicates an influence degree of the air condition exerted on each of the nine regions by the ventilation fan. As the numeral is larger, the influence degree is higher.

On the basis of the control target device data 321, the environmental detector data 322, and the device map data 323 stored in the storage unit 32, the calculation unit 33 in the air condition control device 30 calculates an influence degree of the air condition on each of the regions exerted by each of the air condition changing devices 50A, 50B, and 50C.

Figures 21, 22:
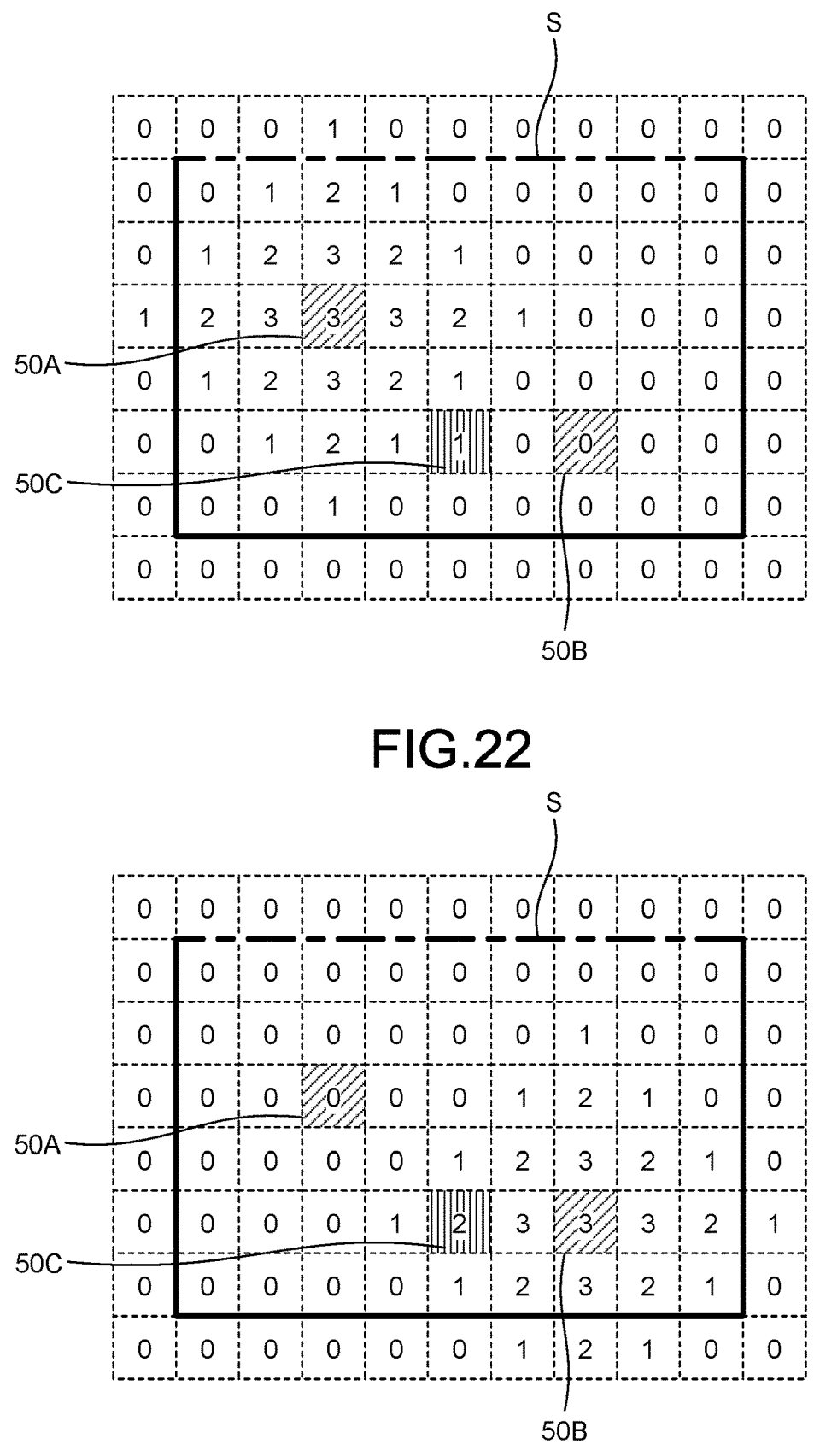

Assuming that air blown from each outlet of the air condition changing device 50A is directed forward, the calculation unit 33 calculates the influence degree on each of the regions illustrated in FIG. 21. FIG. 21 is a third diagram illustrating the influence degree on each of the regions when air blown from each outlet of a single air condition changing device is directed forward. The single air condition changing device is the air condition changing device 50A. In FIG. 21, each of the regions is surrounded by the broken lines, and the influence degree on each of the regions is shown by a numeral. Some of the regions are positioned along the outer edge of the room space S. Each of these regions has one side or two sides illustrated by the solid line.

Assuming that air blown from each outlet of the air condition changing device 50B is directed forward, the calculation unit 33 calculates the influence degree on each of the regions illustrated in FIG. 22. FIG. 22 is a fourth diagram illustrating the influence degree on each of the regions when air blown from each outlet of a single air condition changing device is directed forward. The single air condition changing device is the air condition changing device 50B. In FIG. 22, each of the regions is surrounded by the broken lines, and the influence degree on each of the regions is shown by a numeral. Some of the regions are positioned along the outer edge of the room space S. Each of these regions has one side or two sides illustrated by the solid line.

The calculation unit 33 calculates an influence degree of the air condition exerted by the air condition changing device 50C that is a ventilation fan as illustrated in FIG. 23. FIG. 23 is a diagram illustrating an influence degree on each of the regions when a single air condition changing device is a ventilation fan. In FIG. 23, each of the regions is surrounded by the broken lines, and the influence degree on each of the regions is shown by a numeral. Some of the regions are positioned along the outer edge of the room space S. Each of these regions has one side or two sides illustrated by the solid line.

Next, the calculation unit 33 overlays the data on the influence degree of the air condition exerted by the air condition changing device 50A, the data on the influence degree of the air condition exerted by the air condition changing device 50B, and the data on the influence degree of the air condition exerted by the air condition changing device 50C with one another to calculate a total influence degree that is an influence degree of the air condition exerted by the air condition changing devices 50A, 50B, and 50C. Specifically, the calculation unit 33 overlays the data on the influence degree illustrated in FIG. 21, the data on the influence degree illustrated in FIG. 22, and the data on the influence degree illustrated in FIG. 23 with one another to calculate the total influence degree.

FIG. 24 is a diagram illustrating an example of the total influence degree of the air condition exerted by three air condition changing devices. The three air condition changing devices are the air condition changing device 50A, the air condition changing device 50B, and the air condition changing device 50C. The calculation unit 33 corrects a total influence degree on a region adjacent to the wall of the room space S, taking into account the influence of the wall similarly to the first embodiment.

The calculation unit 33 corrects a total influence degree on a region adjacent to the window in the room space S, taking into account the influence of the window similarly to when the calculation unit 33 corrects a total influence degree on the region adjacent to the wall. The calculation unit 33 also corrects the total influence degree on the basis of a difference between the temperature detected by the first environmental detector 61 and the temperature detected by the second environmental detector 62.

Figures 25, 26:
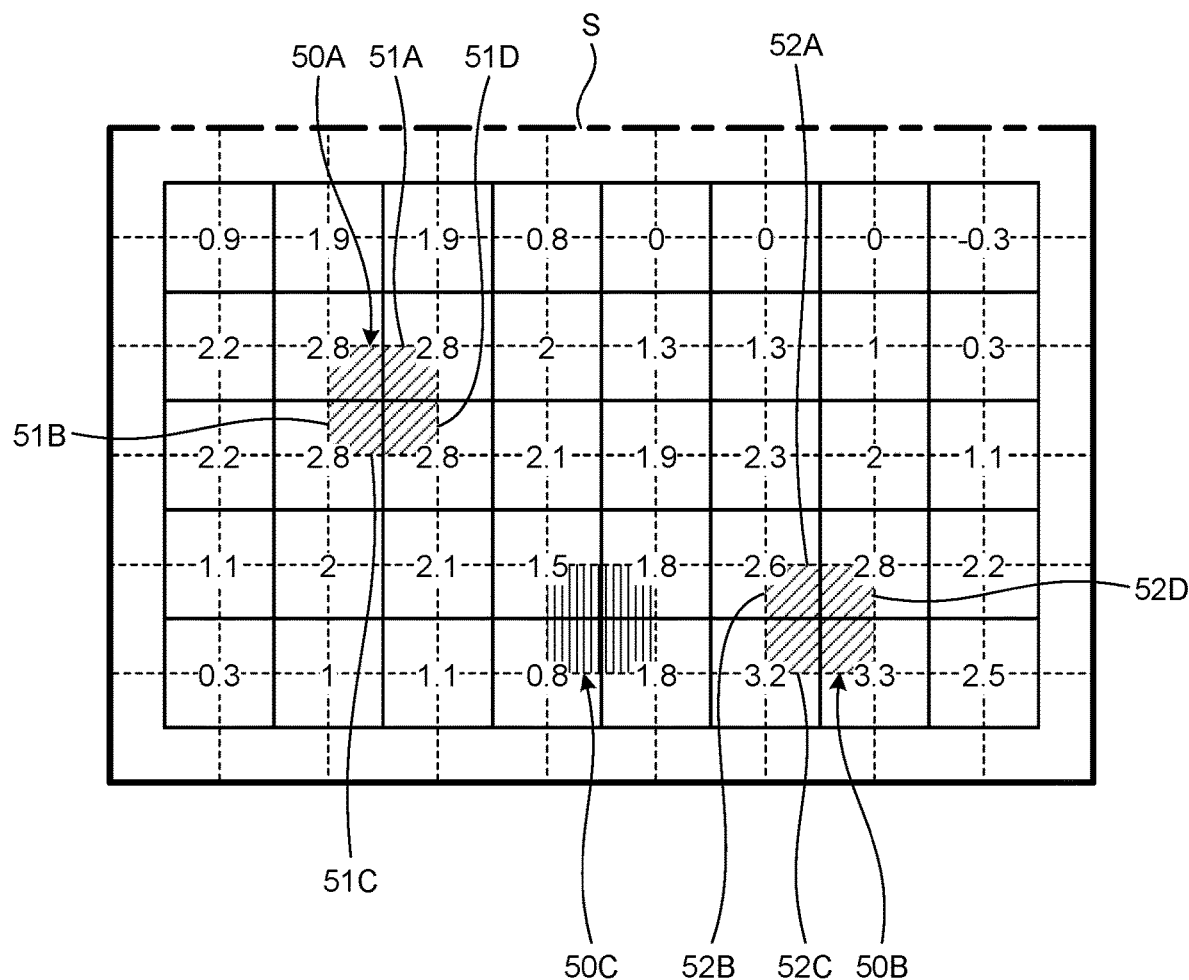
FIG. 25 is a diagram illustrating a relation between a temperature difference and a correction value used for correcting a total influence degree.
FIG. 26 is a diagram illustrating an example of a control influence degree at each of the control points in the room space calculated by the calculation unit included in an air condition control device according to a second embodiment.

FIG. 25 is a diagram illustrating a relation between the temperature difference and the correction value used for correcting a total influence degree. In FIG. 25, the outside air temperature is detected by the second environmental detector 62, and the room temperature is detected by the first environmental detector 61. In a case where the air condition changing device 50A and the air condition changing device 50B are both running for cooling or drying, the correction value is 0 when a temperature difference obtained by subtracting the room temperature from the outside air temperature is less than 5° C., the correction value is −0.5 when the temperature difference is equal to or greater than 5° C. and less than 10° C., and the correction value is −1 when the temperature difference is equal to or greater than 10° C. In a case where the air condition changing device 50A and the air condition changing device 50B are both running for heating, the correction value is 0 when a temperature difference obtained by subtracting the outside air temperature from the room temperature is less than 5° C., the correction value is −0.5 when the temperature difference is equal to or greater than 5° C. and less than 10° C., and the correction value is −1 when the temperature difference is equal to or greater than 10° C.

In view of the running status of the air condition changing device 50A and the air condition changing device 50B, the calculation unit 33 corrects the total influence degree by using the correction value corresponding to the temperature difference between the outside air temperature and the room temperature. That is, the calculation unit 33 corrects the total influence degree by using environmental information inside the room space S and environmental information outside the room space S.

Next, the calculation unit 33 calculates a control influence degree at each of the control points in the room space S on the basis of the total influence degree on each of the regions similarly to the first embodiment. The calculation unit 33 calculates the control influence degree on the basis of the corrected total influence degrees.

FIG. 26 is a diagram illustrating an example of the control influence degree at each of the control points in the room space S calculated by the calculation unit 33 included in the air condition control device 30 according to the second embodiment. As illustrated in FIG. 26, the calculation unit 33 calculates the control influence degree at each of the control points in the room space S on the basis of the total influence degrees.

The control unit 34 in the air condition control device 30 controls the air condition changing devices so as to increase the control influence degree at a control point, which is relatively low among the control influence degrees at the control points calculated by the calculation unit 33.

Specifically, the control unit 34 controls the air condition changing device 50A such that air blown from the outlet 51A is directed rightward, air blown from the outlet 51B is directed rightward, air blown from the outlet 51C is directed rightward, and air blown from the outlet 51D is directed leftward. The control unit 34 controls the air condition changing device 50B such that air blown from the outlet 52A is directed rightward, air blown from the outlet 52B is directed forward, air blown from the outlet 52C is directed rightward, and air blown from the outlet 52D is directed leftward.

As described above, the air condition control device 30 according to the second embodiment corrects the total influence degree by using environmental information inside the room space S and environmental information outside the room space S. The environmental information is, for example, information indicating a temperature. The air condition control device 30 controls a plurality of air condition changing devices by using a control influence degree on the basis of a total influence degree corrected by using the environmental information inside the room space S and the environmental information outside the room space S. Due to this control, the air condition control device 30 can prevent the comfort of the air condition in the room space S from being impaired in its entirety by taking into account the environmental difference between the inside and outside of the room space S.

It is allowable that the control unit 34 in the air condition control device 30 regularly controls the air condition changing devices so as to increase the control influence degree at a control point, which is relatively low among the control influence degrees at the control points calculated by the calculation unit 33. This control can further prevent the comfort in the room space S from being impaired in its entirety.

Third Embodiment

In the first embodiment and the second embodiment, a priority is not set for determining to control the air condition at a plurality of control points in the room space S. A user may desire one of the control points to receive concentrated airflow. A user may desire one of the control points not to receive airflow. In a third embodiment, a priority is set for some of the control points and is used for determining to control the air condition.

In the third embodiment, a state is assumed in which the air condition changing devices 50A, 50B, and 50C are located in the room space S. That is, in the third embodiment, the state illustrated in FIG. 18 is assumed, which is used in the second embodiment. FIG. 27 is a diagram illustrating an example of the priority to be used for determining to control the air condition at some of the control points in the room space S.

As illustrated in FIG. 27, some of the regions are assigned with a character string "priority" and a numeral. The numeral indicates a priority. The priority is set for a region assigned with the character string "priority" and a numeral. The calculation unit 33 corrects a total influence degree on the basis of the priority, which is described later in detail. While FIG. 27 illustrates a priority "1" to a priority "5", the priority is not limited to five levels from "1" to "5".

FIG. 28 is a diagram illustrating an example of the relation between the correction value and the priority to be used when the calculation unit 33 in the air condition control device 30 according to the third embodiment corrects a total influence degree. For example, FIG. 28 illustrates that the correction value is −4 for the priority "1", and the correction value is 4 for the priority "5". When a user desires a certain control point to receive concentrated airflow, the priority is set to a negative value for a single region making up the certain control point. When a user desires a specific control point not to receive airflow, the priority is set to a positive value for a single region making up the specific control point.

On the basis of the control target device data 321 and the device map data 323 stored in the storage unit 32, the calculation unit 33 calculates an influence degree of the air condition on each of the regions exerted by each of the air condition changing devices 50A, 50B, and 50C.

The calculation unit 33 overlays the data on the influence degree of the air condition exerted by the air condition changing device 50A, the data on the influence degree of the air condition exerted by the air condition changing device 50B, and the data on the influence degree of the air condition exerted by the air condition changing device 50C with one another to calculate a total influence degree that is the influence degree of the air condition exerted by the air condition changing devices 50A, 50B, and 50C. It is allowable that the calculation unit 33 corrects the total influence degree by using environmental information inside the room space S and environmental information outside the room space S similarly to the second embodiment.

Figure 29:
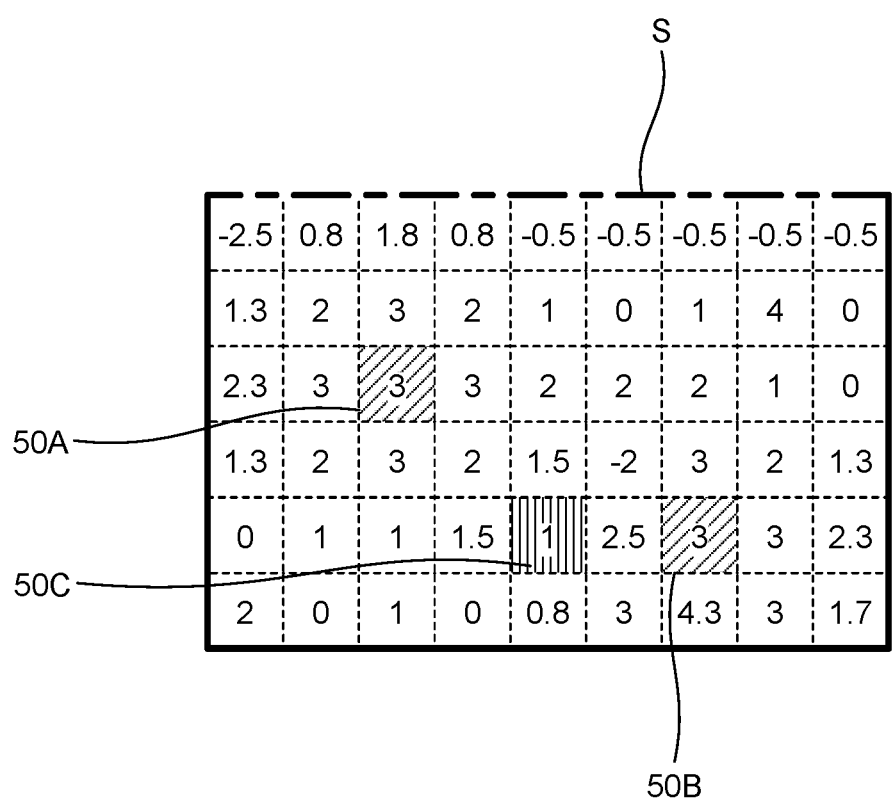
FIG. 29 is a diagram illustrating an example of a corrected total influence degree in the third embodiment.

The calculation unit 33 corrects the calculated total influence degree or the corrected total influence degree by using the priority information and the correction value information. The priority information and the correction value information are stored in the storage unit 32. FIG. 29 is a diagram illustrating an example of the corrected total influence degree in the third embodiment.

Figure 30:
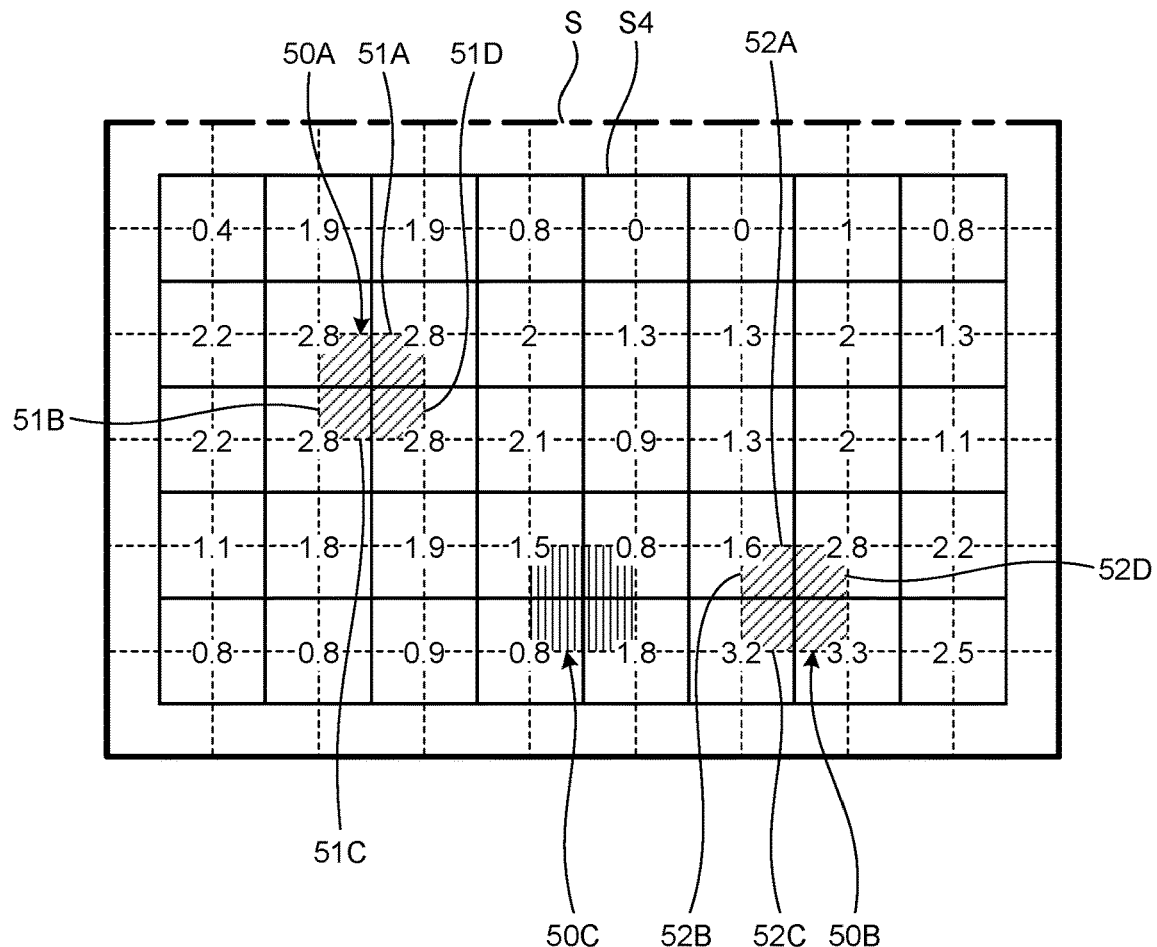
FIG. 30 is a diagram illustrating an example of a control influence degree at each of the control points in the room space calculated by the calculation unit included in the air condition control device according to the third embodiment.

The calculation unit 33 calculates a control influence degree at each of the control points in the room space S on the basis of the corrected total influence degree on each of the regions similarly to the first embodiment. FIG. 30 is a diagram illustrating an example of the control influence degree at each of the control points in the room space S calculated by the calculation unit 33 included in the air condition control device 30 according to the third embodiment.

The control unit 34 controls the air condition changing devices 50A and 50B so as to increase the control influence degree at a control point, which is relatively low among the control influence degrees at the control points calculated by the calculation unit 33.

Specifically, the control unit 34 controls the air condition changing device 50A such that air blown from the outlet 51A is directed rightward, air blown from the outlet 51B is directed rightward, air blown from the outlet 51C is directed leftward, and air blown from the outlet 51D is directed leftward. The control unit 34 controls the air condition changing device 50B such that air blown from the outlet 52A is directed leftward, air blown from the outlet 52B is directed forward, air blown from the outlet 52C is directed rightward, and air blown from the outlet 52D is directed leftward.

As described above, the air condition control device 30 according to the third embodiment corrects a total influence degree by using a priority to be used for determining to control the air condition at some of the control points in the room space S. The air condition control device 30 controls a plurality of air condition changing devices by using a control influence degree on the basis of the corrected total influence degrees. Due to this control, the air condition control device 30 can give a higher priority to some of the control points when adjusting the air condition.

It is allowable that the control unit 34 in the air condition control device 30 regularly controls the air condition changing devices so as to increase the control influence degree at a control point, which is relatively low among the control influence degrees at the control points calculated by the calculation unit 33. This control can further prevent the comfort in the room space S from being impaired in its entirety.

Figure 31:
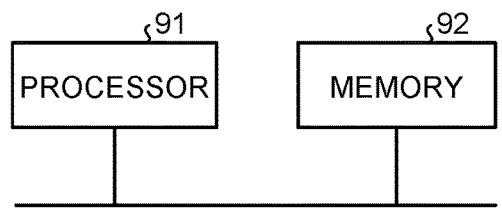
FIG. 31 is a diagram illustrating a processor in a case where some or all of the functions of a communication unit, the calculation unit, and the control unit are implemented by a processor, where these units are included in the air condition control device according to the first, second, and third embodiments.

FIG. 31 is a diagram illustrating a processor 91 in a case where some or all of the functions of the communication unit 31, the calculation unit 33, and the control unit 34 are implemented by the processor 91, where these units are included in the air condition control device 30 according to the first, second, and third embodiments. That is, some or all of the functions of the communication unit 31, the calculation unit 33, and the control unit 34 may be implemented by the processor 91 that executes programs to be stored in a memory 92. The processor 91 is a device such as a Central Processing Unit (CPU), a processing device, an arithmetic device, a microprocessor, or a Digital Signal Processor (DSP). The memory 92 is also illustrated in FIG. 31.

In a case where some or all of the functions of the communication unit 31, the calculation unit 33, and the control unit 34 are implemented by the processor 91, some or all of the functions are implemented by the processor 91 and software, firmware, or a combination of software and firmware. Software or firmware is described as programs and stored in the memory 92. The processor 91 reads and executes the program stored in the memory 92, thereby implementing some or all of the functions of the communication unit 31, the calculation unit 33, and the control unit 34.

In a case where some or all of the functions of the communication unit 31, the calculation unit 33, and the control unit 34 are implemented by the processor 91, the air condition control device 30 includes the memory 92 that stores therein programs that result in the execution of steps to be performed by some or all of the communication unit 31, the calculation unit 33, and the control unit 34. The programs stored in the memory 92 are also regarded as causing a computer to execute the procedure or method conducted by some or all of the communication unit 31, the calculation unit 33, and the control unit 34.

The memory 92 is, for example, a non-volatile or volatile semiconductor memory such as a random access memory (RAM), a read only memory (ROM), a flash memory, an erasable programmable read only memory (EPROM), or an electrically erasable programmable read only memory (EEPROM (registered trademark)); a magnetic disk; a flexible disk; an optical disk; a compact disc; a mini disc; a digital versatile disk (DVD); or the like.

Figure 32:
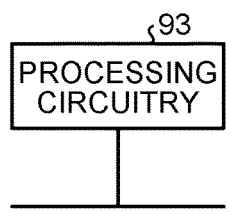
FIG. 32 is a diagram illustrating a processing circuitry in a case where some or all of the communication unit, the calculation unit, and the control unit are implemented by the processing circuitry, where these units are included in the air condition control device according to the first, second, and third embodiments.

FIG. 32 is a diagram illustrating a processing circuitry 93 in a case where some or all of the communication unit 31, the calculation unit 33, and the control unit 34 are implemented by the processing circuitry 93, where these units are included in the air condition control device 30 according to the first, second, and third embodiments. That is, some or all of the communication unit 31, the calculation unit 33, and the control unit 34 may be implemented by the processing circuitry 93.

The processing circuitry 93 is dedicated hardware. The processing circuitry 93 is, for example, a single circuit, a composite circuit, a programmed processor, a parallel-programmed processor, an Application Specific Integrated Circuit (ASIC), a Field-Programmable Gate Array (FPGA), or a combination thereof.

While there are a plurality of functions of the communication unit 31, the calculation unit 33, and the control unit 34, it is allowable that some of the functions are implemented by software or firmware and the other functions are implemented by dedicated hardware. In this manner, the functions of the communication unit 31, the calculation unit 33, and the control unit 34 can be implemented by hardware, software, firmware, or a combination thereof.

It is allowable that at least some of the functions of the communication unit 11 and the reception unit 12 are implemented by a processor that executes programs stored in a memory, where these units are included in the reception device 10 according to the first to third embodiments. The memory is a memory for storing the programs that result in the execution of at least some of the steps to be performed by the communication unit 11 and the reception unit 12. At least some of the functions of the communication unit 11 and the reception unit 12 may be implemented by a processing circuitry. The processing circuitry is similar to the processing circuitry 93.

It is allowable that at least some of the functions of the image obtaining unit 21 and the communication unit 22 are implemented by a processor that executes programs stored in a memory, where these units are included in the image obtaining device 20 according to the first to third embodiments. The memory is configured to store therein programs that result in the execution of at least some of the steps to be performed by the image obtaining unit 21 and the communication unit 22. At least some of the functions of the image obtaining unit 21 and the communication unit 22 may be implemented by a processing circuitry. The processing circuitry is similar to the processing circuitry 93.

It is allowable that at least some of the functions of the environmental detection unit 41 and the communication unit 42 are implemented by a processor that executes programs stored in a memory, where these units are included in the environmental detector 40 according the first to third embodiments. The memory is configured to store therein programs that result in the execution of at least some of the steps to be performed by the environmental detection unit 41 and the communication unit 42. At least some of the functions of the environmental detection unit 41 and the communication unit 42 may be implemented by a processing circuitry. The processing circuitry is similar to the processing circuitry 93.

The configurations described in the above embodiments are only examples of the content of the present invention. The configurations can be combined with other well-known techniques, and part of each of the configurations can be omitted or modified without departing from the gist of the present invention.

The invention claimed is:

1. An air condition control device comprising:
a memory to store therein positional information that indicates a position where each of a plurality of air condition changing devices is located in a room space, the each of the plurality of air condition changing devices being able to change an air condition, influence degree information that indicates an influence degree of an air condition exerted on each of a plurality of locations by the each of the plurality of air condition changing devices, the influence degree being an influence degree under each running condition, and running condition information that indicates a running condition of the each of the plurality of air condition changing devices;
a calculating circuitry to (i) calculate, for the room space which is divided into a plurality of regions with equal areas, for each region of the plurality of regions, a total influence degree on a basis of the positional information, the influence degree information, and the running condition information stored in the memory, the total influence degree being a total value of the influence degree of an air condition exerted by the plurality of air condition changing devices, and (ii) calculate a control influence degree, intended for controlling the plurality of air condition changing devices, at each control point of a plurality of control points in the room space on a basis of the total influence degree calculated for the each region of the plurality of regions, wherein a control point is defined as a point of a set of the plurality of regions which are adjacent to each other on a plane, the control influence degree being an influence degree of an air condition exerted by the plurality of air condition changing devices; and
a controlling circuitry to
determine a control point of the plurality of control points, which has a relatively low control influence degree among the calculated control influence degrees which were calculated at the plurality of control points, and
control the plurality of air condition changing devices so as to increase the control influence degree at the control point determined to have the relatively low control influence degree.

2. The air condition control device according to claim 1, wherein the memory stores the positional information therein on a basis of information input to a reception device that receives information input by a user, or stores therein the positional information calculated on a basis of an image obtained by an image obtaining device that obtains an image of the room space.

3. The air condition control device according to claim 1, wherein the memory stores the influence degree information and the running condition information therein on a basis of information input to a reception device that receives information input by a user.

4. The air condition control device according to claim 1, wherein
the memory further stores partition part information therein, the partition part information being information on a partition part forming the room space, and
the calculating circuitry corrects the total influence degree by using the partition part information stored in the memory, and calculates the control influence degree on a basis of the corrected total influence degree.

5. The air condition control device according to claim 1, wherein the calculating circuitry corrects the total influence degree by using environmental information inside the room space and environmental information outside the room space, and calculates the control influence degree on a basis of the corrected total influence degree.

6. The air condition control device according to claim 1, wherein
- the memory further stores therein priority information that indicates a priority to be used for determining to control an air condition at some of the control points, and correction value information that indicates a correction value for each of a plurality of priorities, and
- the calculating circuitry corrects the total influence degree by using the priority information and the correction value information stored in the memory, and calculates the control influence degree on a basis of the corrected total influence degree.

7. The air condition control device according to claim 6, wherein the memory stores the priority information and the correction value information therein on a basis of information input to a reception device that receives information input by a user.

8. The air condition control device according to claim 1, wherein the controlling circuitry regularly controls the plurality of air condition changing devices so as to increase the control influence degree at the control point determined to have the relatively low control influence degree.

* * * * *